(12) United States Patent
Costanza

(10) Patent No.: US 6,594,535 B1
(45) Date of Patent: Jul. 15, 2003

(54) MATERIAL AND INVENTORY CONTROL SYSTEM FOR A DEMAND FLOW PROCESS

(75) Inventor: John R. Costanza, Parker, CO (US)

(73) Assignee: Demand Flow Institute, LLC, Englewood, CO (US)

(*) Notice: Subject to any disclaimer, the term of this patent is extended or adjusted under 35 U.S.C. 154(b) by 0 days.

(21) Appl. No.: 09/229,398

(22) Filed: Jan. 11, 1999

(51) Int. Cl.[7] ............................................. G06F 19/00
(52) U.S. Cl. ........................................... 700/97; 705/28
(58) Field of Search .............................. 700/95–97, 99, 700/106, 107; 705/28, 29

(56) References Cited

U.S. PATENT DOCUMENTS

| 4,459,663 | A |   | 7/1984  | Dye ........................... 364/200    |
|-----------|---|---|---------|-------------------------------------------|
| 4,827,423 | A |   | 5/1989  | Beasley et al. .............. 364/468     |
| 5,077,661 | A |   | 12/1991 | Jain et al. ................... 364/402    |
| 5,119,307 | A |   | 6/1992  | Blaha et al. ................. 364/468     |
| 5,197,001 | A |   | 3/1993  | Mukherjee ................... 364/403      |
| 5,216,593 | A | * | 6/1993  | Dietrich et al. ............. 345/467      |
| 5,249,120 | A |   | 9/1993  | Foley .......................... 364/401    |
| 5,311,438 | A |   | 5/1994  | Sellers et al. ............... 364/468     |
| 5,315,509 | A |   | 5/1994  | Natarajan .................... 364/401     |
| 5,548,518 | A |   | 8/1996  | Dietrich et al. ........ 364/468.06       |
| 5,608,621 | A | * | 3/1997  | Caveney et al. .............. 705/10       |
| 5,699,259 | A | * | 12/1997 | Colman et al. ........... 364/468.05       |
| 5,764,543 | A | * | 6/1998  | Kennedy ................ 395/500.23        |
| 5,778,386 | A | * | 7/1998  | Lin et al. ..................... 707/10    |
| 5,884,300 | A | * | 3/1999  | Brockman ..................... 707/2       |
| 5,914,878 | A | * | 6/1999  | Yamamoto et al. ..... 364/468.13           |
| 5,963,919 | A | * | 10/1999 | Brinkley et al. .............. 705/28      |
| 5,974,395 | A | * | 10/1999 | Bellini et al. .................. 705/9    |
| 6,094,603 | A | * | 7/2000  | Ishii ............................. 700/97 |
| 6,119,102 | A | * | 9/2000  | Rush et al. .................... 705/29    |
| 6,122,560 | A | * | 9/2000  | Tsukishima et al. ........ 700/106         |

* cited by examiner

Primary Examiner—William Grant
Assistant Examiner—Zoila Cabrera
(74) Attorney, Agent, or Firm—William W. Cochran II

(57) ABSTRACT

A material flow design system for a mixed-model demand flow manufacturing line is presented. The material flow system utilizes a replenishment card/replenishment container system of material management. The material flow design system defines the size of replenishment containers and the location of material deduct points in the production path. The material flow design system may further include a design system for designing an inventory control system. The inventory control system involves locating backflush and intermediate backflush locations on the production path and deduct points in the material flow sequence. An inventory monitoring system monitors material flow, deducts material from inventories at deduct points, and credits material to inventory indicated by the deduct points when products produced by the manufacturing line flow through material backflush points defined in the manufacturing line.

11 Claims, 12 Drawing Sheets

MATERIAL AND INVENTORY CONTROL SYSTEM FOR A DEMAND FLOW PROCESS

BACKGROUND

1. Field of the Invention

This invention relates to a method for designing the material flow and material inventory control to a production process line and, more particularly, to computer software for the design and supervision of material flow and material inventory control to a production line.

2. Background of the Invention

In a manufacturing production line, it is important that raw material is presented at the point of usage at or before the time that the material is to be used. In this case, material refers to raw materials (i.e., nuts bolts, wheels, fenders or other components or materials used on a production line) that are used in the production of a final product. The point of usage of a material is that point in the production path of a product where that material is used in the production of that product. One method that has been used to insure that material reaches its point of usage on the production line is a scheduling method.

In the scheduling method, the quantity of material delivered to the point of usage is that required to produce a batch quantity of product that is to be completed at some future time. The delivery of material is also scheduled in a batch process. The batch processing method is often necessary because factories are designed to manufacture products in a variety of functional departments and the scheduling is used to plan the manufacture of products through the facility. The basis of the schedule is a sales forecast for the product and quantities that customers are predicted to purchase. It is common, for example, for a kit of material to be assembled and delivered to the production plant floor in response to an order for an amount of product. The kit of material contains all of the material that is required to produce the ordered amount of final product.

This scheduling method results in component parts being issued or allocated to a product before that material is consumed or used. This allocation method results in limits to the flexibility of material usage. There is also an increased cost due to overhead from excessive material computer transactions and non-value added material counts.

This old methodology of manufacturing, and subsequently the methods of material management, are no longer competitive. When designing a manufacturing process, the tasks performed by individual workers and work stations and the physical flows of material and product between work stations and materials storage areas must be considered. A better design for a mixed-mode manufacturing line involves a demand flow system.

The design of a mixed-model manufacturing line, on the other hand, must be consistent with a process technology strategy that will permit making all functional variations (i.e., models) in a family of products that is produced by the manufacturing line. The wide variation in product features and functionality necessitates flexibility in the manufacturing line in order to accommodate the various process changes, customer demanded changes and material variations associated with the variety of products in the family of products. Conventional mixed-model manufacturing lines are organized into fairly autonomous grouped by either like-equipment or like-skills in order to produce various components of the products.

To produce each product, the manufacturing line for each product includes a set of processes. Traditionally, mixed-model process lines use batch processing since only a single product "run" is produced at any given time. The path of individual products through various work stations and departments is specified using "routing sheets," which contain the operating steps and routing required for each part, and "process flow charts," which describe the desired sequence of specific tasks (e.g., inspections, movements, and storage operations) for that product. In addition, the scheduling process of the "routing sheets" also includes material requirements for each product at each process.

One problem with conventional mixed-model manufacturing lines is that the variety of products produced by the factory are forced to compete for manufacturing resources and equipment. This competition for resources manifests itself in the batch scheduling where only one product is manufactured at a time. This batch scheduling in turn results in long manufacturing latency, or lead time, for other products. Costs associated with this latency include the opportunity cost of customers unwilling or unable to tolerate the long manufacturing lead times, the costs of re-tooling a machine or work station when switching production from one product to another, and the costs of maintaining sufficient work in process (WIP) at each of the processes to permit filling anticipated product orders.

Customers who are unwilling or unable to tolerate a long manufacturing lead time will look to other sources to fill their demand. Lost customers affect the factory's profitability as they represent lost revenue.

Retooling increases the product's manufacturing cost. In that event, either the cost is absorbed by the factory, thereby reducing unit profit, or else the cost is passed on to the customer in the form of higher selling prices. Unless the product is unique and unavailable elsewhere, a higher selling price usually results in lower demand and, consequently, in lower revenues for that product.

Work-in-process represents a lost opportunity cost. Material and labor in WIP represents tied-up capital that cannot be recovered until processing has been completed and the finished goods (the products) are shipped to the customer.

Manufacturers have developed various manufacturing strategies which seek to mitigate some of the costs associated with mixed-model manufacturing process lines. One strategy, commonly called "just-in-time" (JIT) manufacturing, teaches that just enough work is started to ensure that WIP is minimized. This strategy, however, does not alleviate the batch scheduling inefficiencies of mixed model manufacturing lines, and may result in an excess amount of finished goods inventory. The capital that was invested in WIP is, in JIT processing, invested in finished goods. Other strategies that promise to solve the problems of manufacturing processes, such as "total market quality" (TQM) and the like, suggest changes in the way conventional mixed-model manufacturing lines are managed but do not solve the problems of conventional mixed model manufacturing lines. Accordingly, use of these various strategies has resulted in improvements to the batch-oriented scheduled processing associated with a mixed-model manufacturing line, but the fundamental problems of manufacturing latency, retooling, and unfinished and finished goods inventory remain.

Another problem with conventional mixed-model manufacturing line designs is that dissimilarity in the types of processes used to manufacture the various products introduces resource inefficiencies, such as machine and labor inefficiencies, associated with idle process lines. As discussed above, conventional mixed-model manufacturing is a batch process in which a process group or department works on only one particular product at any given time. Work orders are used to schedule and issue materials required to create the components and subassemblies of that product. These materials are batch-processed into the components and subassemblies, and then staged as WIP until the next process is ready to receive them. During the time the batch process is occurring, the WIP in upstream processes must wait until it can be scheduled into the current process, thereby tying-up capital in the upstream WIP. In addition, downstream processes may be idle while the upstream process completes the batch processing. This idle machine time, and the labor and overhead required to maintain the upstream idle process, represents an undesirable inefficiency and an additional cost to the factory. The accumulation of WIP and the frequency of idle processes is aggravated when the actual process time (the time to process a standard batch size) at each process is different.

A manufacturing design system, implemented on a computer, that designs manufacturing lines without many of these concerns is described in U.S. application Ser. No. 09/186919, "System and Method for Designing a Mixed-Model Manufacturing Process," John R. Costanza. In the mixed-model manufacturing line, or the Demand Flow™ Technology, essentially none of the inefficiencies associated with the mixed-model, batch-oriented manufacturing lines are exhibited.

In the manufacturing line, it is important that material arrives at its point-of-usage on the production path at or before the time when it is to be used. In addition, for reducing the material inventory in the manufacturing plant, it is desirable, in order to reduce inventories and storage space, that the amount of material stored at the manufacturing plant be held at a minimum.

In addition to material handling, there are issues of inventory control. The term "backflush" is defined as being an inventory control process by which components or raw materials that are considered as having been consumed with production processes are automatically relieved (i.e., deducted) from the inventory records. Usually, the materials required to produce a product are deducted from the parts inventory when the product is placed on a finished goods inventory. Often, this takes a great deal of paperwork as the material is back-traced through the production process. Therefore, materials can be credited to the materials inventory much longer than is necessary, especially in production processes which have long-time finishing processes that require little in the way of materials to accomplish. It is desirable to institute an inventory management program that allows relief of inventories before the product is entered in a finished goods inventory.

The manufacturing line described above anticipates that the material required to perform each process is present at the process in time for its use. Therefore, there is a need for an efficient system of material management and for material accounting. Additionally, there is a need for a system for designing the material management and material accounting system. Additionally, there is a need for a system that manages the material accounting system while the manufacturing line is in operation.

SUMMARY

In accordance with the present invention, a material flow design system is presented. The material flow design system, using a computer system, designs and monitors material to the production paths of a manufacturing line using a replenishment card pull sequence. In addition, product flow can be monitored through the production path using a replenishment pull sequence.

Embodiments of the material flow design system determine the size of replenishment containers (i.e., the amount of material that is stored in each replenishment container) in order to insure that material arrives as needed at the point-of-usage on the production path and that the quantity of material stored at the manufacturing plant is at a minimum.

One embodiment of the material flow design system includes determining the material requirements for the manufacturing line, defining pull sequences of material to the processes on the manufacturing line, and sizing replenishment containers for each point-of-usage in the pull sequence. The materials requirements are determined from the bill-of-materials for each product produced by the manufacturing line. The bill-of-materials includes the material required to produce the product. Pull sequences are defined such that material flows from a raw inventory storage or an independent production path through one or more points-of-usage to the production path of the manufacturing line in response to the need for that material at the production path. Sizing replenishment containers, and determination of replenishment signals, is calculated using demand-at-capacity values for material requirements at the production path and required times to replenish replinshment containers at each point-of-usage on the pull sequence.

One embodiment of the design system also identifies backflush locations on the production paths and deduct points on the material pull sequences where inventory accounting can be accomplished. In general, when material is delivered to the manufacturing plant it is credited to raw inventory accounting. Material is deducted from raw inventory accounting and credited to raw-in-process inventory accounting when it is pulled from a raw inventory storage area into the manufacturing plant. Materials have assigned deduct points (where the material is deducted from the raw-in-process inventory) based on the location of material pull in the raw-in-process area. At a backflush location, material is deducted from the raw-in-process inventory accounting and credited to a consignment accounting, a scrap accounting, or an in-process accounting depending on whether the deduct point triggers a consignment accounting, scrap accounting or inventory accounting, respectively. There may be other intermediate backflush points for transactions based on the types and length of the processing times.

These embodiments of the invention are further described below along with the following drawings.

BRIEF DESCRIPTION OF THE FIGS.

DESCRIPTION OF THE INVENTION

Definitions

Figure 1:
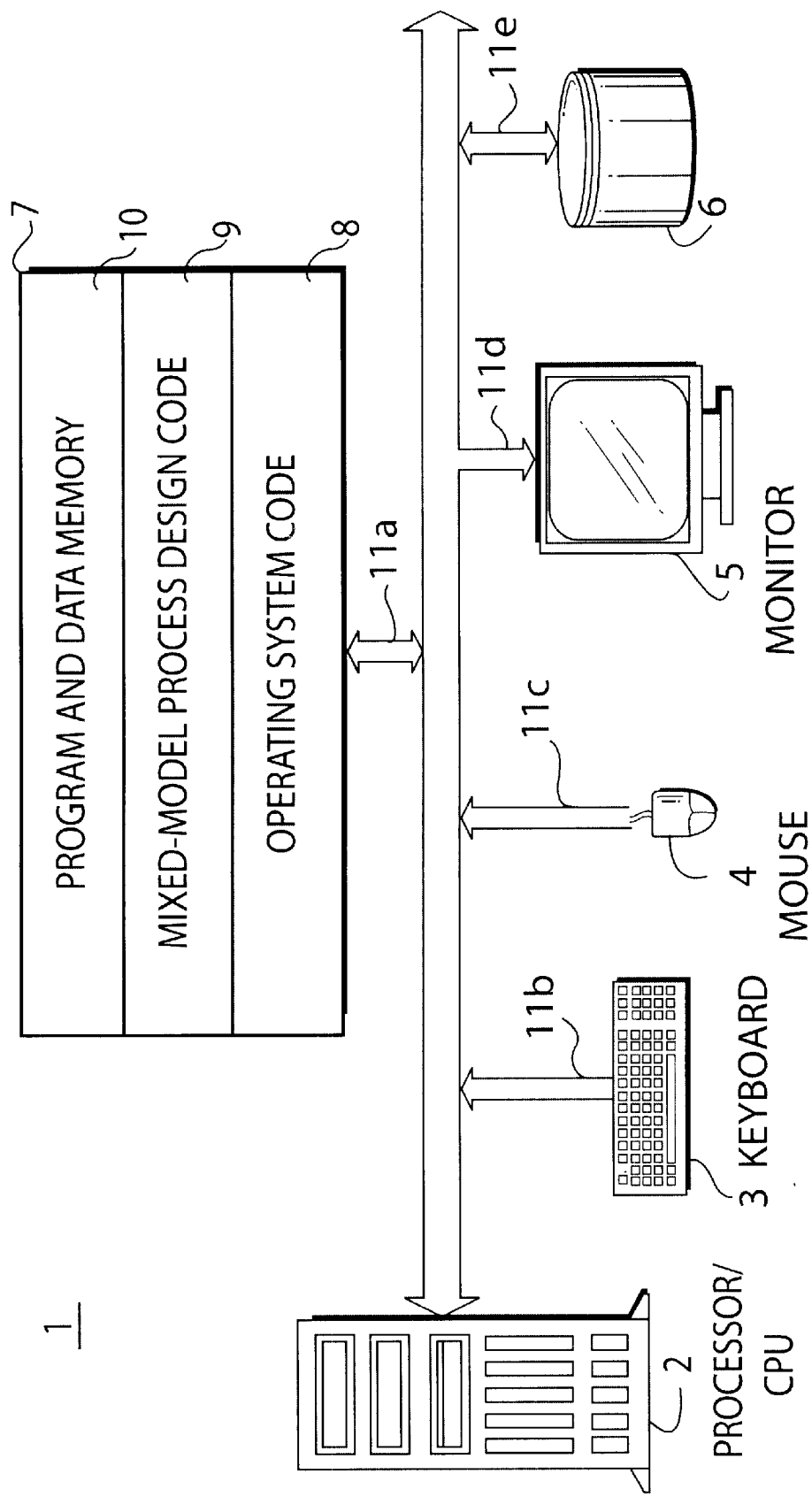
FIG. 1 is a conceptual block diagram of a computerized mixed-model manufacturing process design system according to the present invention.

The following definitions are listed here as an aid to understanding the description of embodiments of the invention:

| | |
|---|---|
| actual cycle time (AT) | The actual cycle time is the actual amount of time required to perform a task, process, or sequence of processes. The actual cycle time for product i at process j, $At_{ij}$, is the actual amount of time required for a unit of product i to flow through process j. |
| Backflush Point | Defined as the end of the manufacturing process where a product is completed and an inventory transaction takes place. The product has been completed and thus all materials on the Bill of Materials have been consumed and are transacted out of raw-in-process material accounting at the defined deduct points. |
| bill-of-material | The bill-of-material lists all of the material that is included in one unit of final product. |
| cell | A grouping of dissimilar resources (for example people and machines) in a logical and sequential manner to facilitate the flow of a product or a family of products. |
| consumption point | The consumption point refers to a storage area where material is depleted. For example, a consumption point can refer to a point-of-usage resupply or a point-of-usage. |
| Deduct point | Point defined within the manufacturing process from which material will be deducted from raw-in-process inventory based on the pull sequence defined. |
| demand weighted average cycle time (ATw) | The demand weighted average cycle time is the average actual cycle time weighted by the demand-at-capacity. For example, the demand weighted average cycle time at process j, $ATw_j$, is the sum over all products of the demand-at-capacity for each product at process j multiplied by the actual cycle time for each product at process j divided by the total demand-at-capacity at process j. |
| demand-at-capacity Dc | The demand-at-capacity, Dc, refers to the maximum demand for a product. Demand-at-capacity may also refer to the total demand for all products. For example, the demand-at-capacity for product i at process j, $DC_{ij}$, refers to the maximum number of product units required to produce product i that process j is expected to produce. Usually, the demand-at-capacity is given in units of product per day of production. However, other time units may be used. |
| downstream process | Refers to a process in the same process path or sequence that occurs closer to the end-of-line. |
| end-of-line (EOL) | The end-of-line is the final point on the manufacturing line. The product is completed at this point on the manufacturing line and is in the form of finished product or finished goods. |
| family of products | A family of products is a grouping of products based on a common feature. Two primary examples of families of products include all of the products that are manufactured by the manufacturing line and all of the products defined in terms of a particular process. |
| feeder path | A feeder path manufactures sub-assemblies or components of products in the family of products manufactured by the manufacturing line. Feeder paths run parallel to another production path and terminate by insertion of the manufactured sub-assembly or component into the process. |
| In-process replenishment | The replenishment management system that can be instituted between subsequent processes in the production path in order to pull products between processes. |
| Independent process | A process for producing a component or part where multiple card replenishment is instituted to pull the component or part to a point-of-usage on the production path of the manufacturing plant. |
| Intermediate backflush location | Physical location on the manufacturing line where a computer transaction takes place moving material from a first deduct point to an in-process deduct point. |
| main path | A main path is a process path that terminates at the end-of-line. This process path is typically the principal production path used to manufacture products and is shared by all or most of the products in the family of products produced by the manufacturing line |
| material | Material refers to any component, part, or other substance that is delivered to a manufacturing plant from an outside supplier or is produced by an independent production path and is used in the production of a product in the family of products of the manufacturing line. |
| Multiple card replenishment | A flexible replenishment management system where material is pulled to a point-of-usage based on multiple card signals. Material is delivered to the consumption point from the point of usage resupply when the multiple card signals arrive at the point of usage resupply. |
| operational-cycle-time (OPc/t) | The operational-cycle-time, or takt time, is the maximum amount of time that a process or sequence of processes can use to produce a unit of product. The operational cycle time for a particular process, $OP_{c/t_j}$, is the maximum amount of time that process j can use to produce a unit of product and meet the demand-at-capacity requirements at EOL. |
| option path | An option path is a process path wherein the work content imparted to the product results in functional or cosmetic changes to the product that are different from those imparted to products in alternate option paths. Option paths are typically responsible for the performance and appearance differences between products. Option paths input product from a process in a production path and insert product at a downstream process in the production path. |
| point-of-usage | The point on the production path where a material is used by a process in the production of a product in the family of products of the manufacturing plant. |
| point-of-usage resupply (alternatively, point-of-resupply) | A resupply storage area located within the manufacturing plant. |
| process path | A process path is a sequence of processes. Process paths can be categorized into one of four basic types: main paths, option paths, feeder paths or rework paths. |
| process yield | The process yield refers to the ratio of the units of product that exit a product to the units of product the enter the process. A process having less than a 100% yield results in a scrap output or output to a rework path. |
| product | A product refers to the manufactured item. The product can be defined in terms of the sequence of processes required to produce the product. Additionally, a quantity of product at a process refers to the material in the process used to produce the product. One unit of product is the amount of material that exists in one final product. |
| product | Refers to the amount of product that leaves the process path, usually as scrap, or enters a rework path. |
| Product/Process map | A matrix indicating which processes are included in the definition of each product. |
| product/task work content map | A matrix indicating the work content imparted to each product by each task. |
| Pull Sequence | Defined material flow for a component part of a product to the processes on the manufacturing line. In a typical pull sequence, material is pulled to a point-of-usage adjacent the process path through multiple points-of-resupply. Pull sequences are defined in terms of the series of points-of-usage through which material is pulled before arriving at the process in the production path where the material is used in production of a product. |
| replenishment signal | Usually implemented as a replenishment card, although electronic signals can also be used. The replenishment card includes information regarding the consumption point, the point-of-usage resupply, the material, and the number of |

-continued

| | |
|---|---|
| | replenishment card signals. The replenishment signal triggers replenishment of material at a point-of-usage. |
| resources | Resources refers to individual machines or quantities of labor. The amount of resources, for example, can be increased for a particular task by increasing the number of machines or people or by increasing the number of hours that the machines and people work. |
| rework path | A rework path inputs rejected (i.e., out-of-specification) quantities of product from a process, remedies the fault in the quantities of product and re-inserts the quantities of product into an upstream process in the process path. In some cases, the rework path inserts quantities of product at the point in the process path where rejected quantities of product were diverted into the rework path. The point of insertion of the recovered quantities of production into the manufacturing line depends on the effective cumulative work content of the quantities of product and will typically be at a point in the process path where first-run parts have the same cumulative work content. The effect of the rework path is to increase the effective yield of the process from which the rework part originated. |
| sequence of events (SOE) | The sequence of events refers to a sequential sequence of tasks. In some embodiments, standardized sequences of events (SSOE) are defined. |
| Single card replenishment | A flexible replenishment management system where material is pulled to a point-of-usage based on a single card signal. |
| takt time | See operational cycle time |
| task | A task is a small unit of work. A task is usually defined in terms of work content and the resources required to impart the work content to the product. |
| time index | A time index is a comparison of a time, usually an actual cycle time for a process, an operation, or a cell, with a takt time for that process, operation, or cell. The comparison is typically a ratio of the two quantities. |
| upstream process | Refers to a process in the same process path or sequence as the current process but occurs towards the beginning of the manufacturing line. |
| work content or work content time | Work content refers to the amount of working time that has been invested in a quantity of product. A process or process path can impart work content to a product. Work content includes machine and labor work times, machine and labor setup times and move times. Work content from a particular process or task may be characterized by whether the work adds value to the final product or does not add value to the final product. Work content may also be petitioned into machine work and labor work. |
| Work in Process (WIP) | Product units that exist in the manufacturing line. WIP can include subassemblies and components of the finished product. |
| work volume | The amount of product that flows through a process, task, or process path. |

Description

FIG. 1 shows a computerized material management design system 1. Design system 1 includes at least one processor 2, at least one input structure such as a keyboard 3, a mouse 4, or other input device such as a bar code scanner, at least one visual display such as a monitor or printer 5 and program and data storage means 6 such as a holographic, magnetic, or optical storage unit and main memory 7 including volatile and non-volatile program and data storage devices. Main memory 7 may include RAM, DRAM, SRAM, or other computer readable medium. Machine readable code for controlling design system 1 according to the present invention is embodied on the program and data storage means 6 and read into the main memory 7 at the time of execution. Main memory 7 includes an operating system code 8, computer code 9 for effectuating the materials management systems of the present invention, and at least one additional memory space 10 for storing programs and data. At least one bus 11 (busses 11a, 11b, 11c, 11d and 11e are shown in FIG. 1) provides electronic communication between the elements of design system 1.

Computer code 9 on computer main memory 7, or alternately on storage unit 6, includes machine readable code segments of a computer program according to the present invention. Computer code 9 directs computerized materials management design system 1 according to embodiments of the present invention.

Figure 2A:
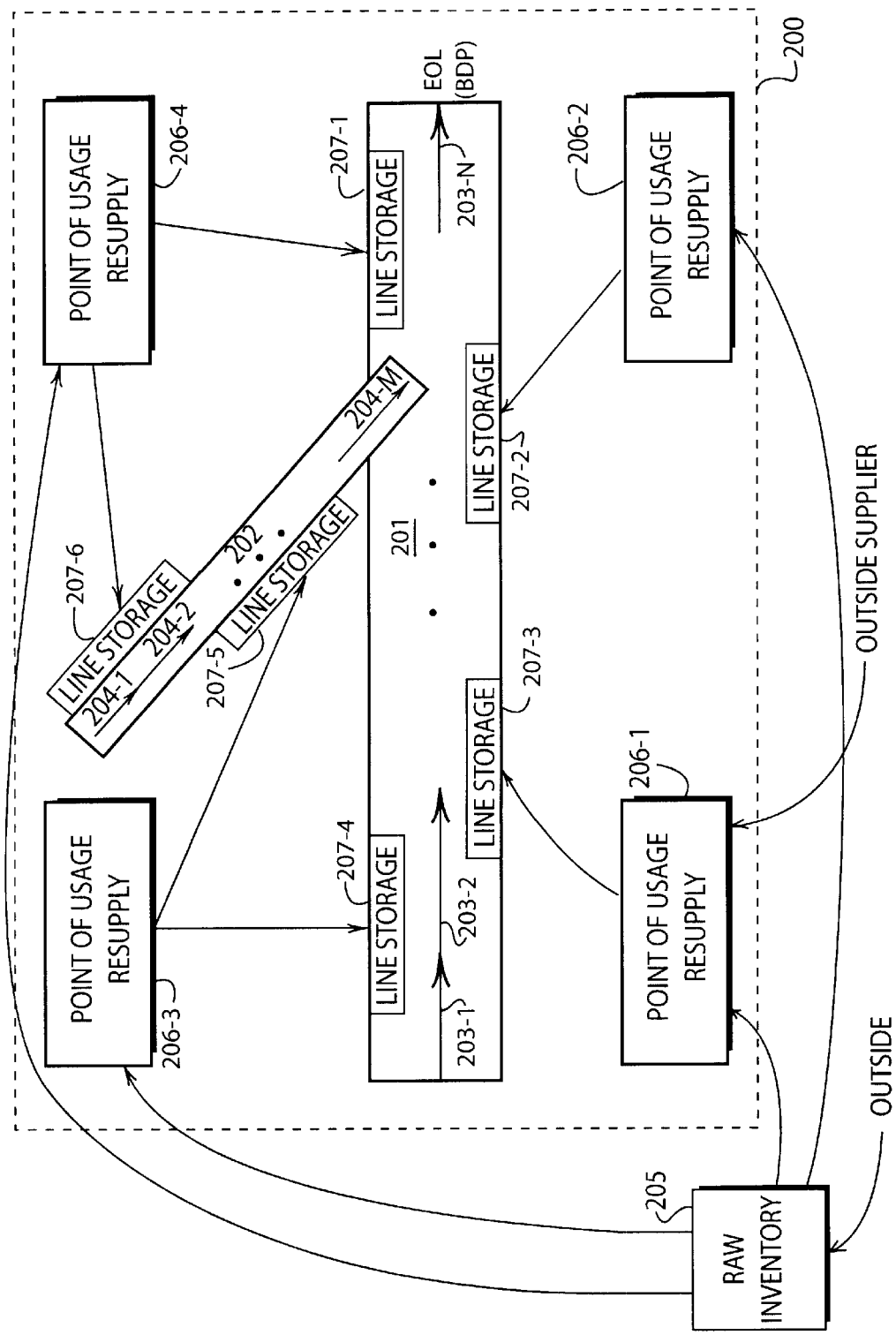
FIG. 2A is a conceptual diagram of a manufacturing plant according to the present invention.

FIG. 2A shows a conceptual diagram of the materials flow through a manufacturing plant 200 according to the present invention. Manufacturing plant 200 includes production paths 201 and 202, although in general any number of production paths can be included. Production path 201 is the main path and includes a series of processes 203-1 through 203-N. In FIG. 2, production path 202 is a feeder path (a path that feeds product into another production path). Manufacturing plant 200 can also include any number of other production paths, including rework production paths, optional production paths, and feeder production paths, for the manufacture of a family of products.

Each production path in manufacturing plant 200 is defined in terms of a series of processes. In FIG. 2A, production path 201 includes processes 203-1 through 203-N and production path 202 includes processes 204-1 through 204-M. Each process represents a process step for producing at least one member of the family of products of manufacturing plant 200. The production paths of manufacturing plant 200 can be designed according to the methods described in U.S. application Ser. No. 09/186,919, "System and Method for Designing a Mixed-Model Manufacturing Process," John R. Costanza, filed on Nov. 6, 1998, and assigned to the same assignee as the present disclosure, herein incorporated by reference in its entirety.

Figure 2B:
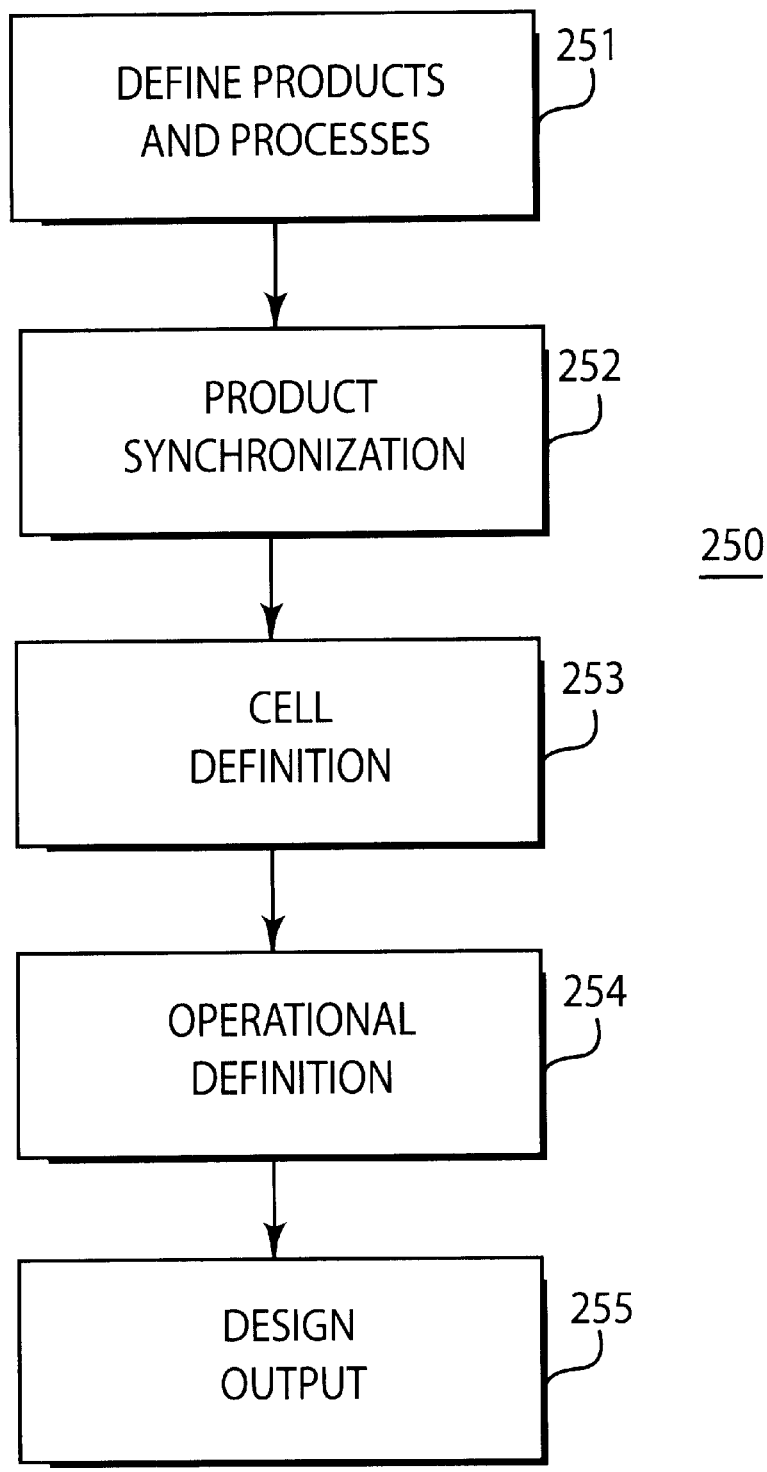
FIG. 2B is a flow chart for a manufacturing line design system.

FIG. 2B shows a flow chart of a manufacturing line design system 250 for designing a manufacturing line. The manufacturing line design system includes algorithms for product and process definitions and balancing or synchronization of product flow. In step 251, products produced by the manufacturing line and processes of the manufacturing line are defined. Each product in the family of products to be manufactured by the manufacturing line is defined in terms of a set of processes that are used to manufacture that product. A process, such as process 203-1 (FIG. 2A) for example, is defined in terms of a set of tasks for making the product and is parametrized in terms of process yield, process path type and other parameters. Processes are characterized in step 251 (FIG. 2B) in that product fallout (e.g., scrap or routing onto a rework or option path) only occurs during the final task of the process. Processes are members of process paths. Process paths are sequences of processes and can be categorized as one of four types: a main path, a feeder path, an option path, or a rework path. In FIG. 2A, process path 201 is classified as a main path while process path 202 is classified as a feeder path.

In step 252, products are synchronized. Once each product is defined in terms of a set of processes, families of products that share a particular process are defined. In addition, knowing what the final end-of-line demand-at-capacity will be for each product, a demand-at-capacity for each product at each process can be determined. The demand-at-capacity is the maximum amount of total product that the manufacturing line or process is required to produce. For example, if the manufacturing line is required to produce 100 units of product A and 100 units of product B, the total demand-at-capacity at end-of-line (EOL) is 200 units. If both products are members of a family of products defined in terms of process C, then process C has a demand-at-capacity of 200 units (100 units of product A and 100 units of product B). If there is product fallout, then the demandat-capacity for certain products at processes may exceed the demand-at-capacity at the end-of-line in order to compensate for the loss.

Following the demand-at-capacity calculation, an operational-cycle-time (alternatively referred to as the takt time) is calculated. The operational-cycle-time is defined as the maximum amount of time in which a unit of product or a component for a unit of product can reside in a process in order to ensure that the demand-at-capacity for that product at that process is satisfied.

The takt time for each process can be balanced, resulting in a continuous mixed-model process flow, by adjusting the operating hours for the process (i.e., adding resources), relocating work, or redesigning product definition or process sequences so that the takt time for each process is approximately a constant. When the balancing is completed, the manufacturing line to accommodate the demand-at-capacity for each product in the family of products manufactured includes sequences of processes that all take approximately the same time to complete. The continuous mixed-model process flow defined in this fashion, therefore, eliminates WIP accumulation and idle processes. Additionally, the concurrent manufacture of mixed models (i.e., products) essentially eliminates long manufacturing lead times associated with traditional batch-processing manufacturing lines.

Further balancing of the manufacturing line can be incorporated. Each of the products can additionally be defined in terms of the work content performed at each process that defines the product. The work content is defined by a sequence of events that in turn is defined as a series of tasks. Some embodiments include a standardized sequence of events to facilitate definition of processes and work contents. Each task in a sequence of events can be characterized in terms of work content times for machines and labor and an attribute for indicating whether the work content adds value to the product or does not add value to the product. For example, machine set-up and transport tasks do not add value to the product. Manufacturing line improvements that eliminate or reduce tasks that do not add value may then be incorporated.

A demand-weighted average cycle time is computed for each process. The demand weighted average cycle time can be computed from the demand-at-capacity for each product at each process and the actual time for each product to pass through each process. The demand weighted average cycle time for each process is compared with the takt time. If the demand weighted average cycle time for a process significantly exceeds the takt time for that process, the number of resources used to perform that process can be increased until the demand weighted average cycle time is acceptably comparable with the takt time.

In step 253, cells are defined. Each process can be redefined as at least a of a cell. A cell is defined as a grouping of dissimilar resources (for example, people and machines) in a logical and sequential manner to facilitate the flow of a product or a family of products. Different products that flow through the cell may require different times. A cell is usually characterized as a series of processes with similar work contents (i.e. taking similar times). Processes having product fallout (i.e., less than 100% yield) are typically delegated to the last process in a cell or isolated in an independent cell, however these process may also occur within cells. In one embodiment, each process defines a cell. In another embodiment, a cell is defined by adding sequential processes to the cell under the direction of a user of the design system.

In yet another embodiment, the design system defines cells by adding sequential processes to the cell in accordance with some requirement such as that the cell does not exceed a maximum work volume.

In one embodiment, cells are defined such that the flow of each product through each process requires approximately the same time. For each product at each process, a time index can be calculated by comparing the actual time for that product to flow through that process with the takt time for that process. If the time index falls outside of a predetermined range, the product can be removed from its current cell and placed within an alternate cell (i.e., placing the process to produce that product in the different cell) having similar characteristics. The removed products may, then, be dropped from the manufacturing line, or produced in a separate manufacturing line, or may flow through a separate option path that includes the offending cell. The resulting manufacturing line operating on the remaining cells is balanced such that each product requires approximately the same time as every other product to flow through each process.

In step 254, operations within each cell are defined. Operations can be defined according to machine dominated tasks if the work content is dominated by machine work, according to labor dominated tasks if the work content is dominated by labor, or according to general mixed tasks. An actual cycle time for each operation in each cell can be calculated and compared with the takt time of the cell, which relates to the takt time of the processes within the cell, to calculate a time index. To balance the operations in the cell, the time index is arranged to fall within a defined range by modifying the cell. These modifications include reducing the work content time per task, reducing move or setup times, identifying overlap times, adding resources, building up resources in upstream processes to compensate and increasing the operating time of the operation, and redesigning processes or products.

These calculations and redefinitions described above may be iterated multiple times until an optimized manufacturing line is designed. When completed, the manufacturing line design is outputted in step 255. In some embodiments, daily manufacturing line management can be accomplished. Given the actual product demand for a given day, for example, the actual required resources for that day can be determined and unused resources can be idled. For example, a process that utilizes multiple identical machines may, on a given day, require many fewer machines or none of the machines. Additionally, resource utilization in the manufacturing line can be calculated and monitored from the actual demand for products.

Material Flow Design —Replenishment Card Material Flow

According to the present invention, material is delivered by outside suppliers to manufacturing plant 200 (FIG. 2A) and stored in raw inventory storage 205. In some cases, certain suppliers may deliver material to points other than raw inventory storage 205. Material in this context refers to the components, parts or subassemblies for producing products in the family of products of manufacturing plant 200. For example, if the family of products includes a red bicycle, then material for that product may include red paint, wheels, frames, front sprockets, rear sprockets, chains, foot pedals, handlebars, seats, and the nuts and bolts to assemble the components. In another manufacturing line, material for a red bicycle may include steel, fuel for casting furnaces, replacement molds for the casting furnaces, and other materials from which the red bicycle is ultimately produced. The material is determined by the requirements of the processes that define the products and whether components are produced at manufacturing plant 200 or purchased from outside suppliers.

In general, there may be several separate storage areas for raw inventory storage 205. Raw inventory storage 205 is the location where raw materials that are shipped into manufacturing plant 200 from outside suppliers are stored. Additional storage locations are not necessary if raw materials for manufacturing plant 200 are delivered from outside vendors at the exact time that they are required by manufacturing plant 200. However, in most cases some storage for raw material inventory is advisable so that a missed delivery of material from a vendor will not affect operation of the manufacturing plant. Note that raw inventory storage 205 may be located at physical locations other than the site of manufacturing plant 200 and may in fact be physically located in trucks where the inventory is delivered directly to manufacturing plant 200. When the material is placed into raw inventory storage 205, a material accounting system credits the material to a raw inventory accounting.

Material from raw inventory storage 205 is then delivered as needed to several points of usage resupply that are located within or very close to manufacturing plant 200. In manufacturing plant 200, there are four points of usage resupply 206-1 through 206-4 shown. In general, there can be any number of points of usage resupply locations. Additionally, certain outside suppliers may supply the points-of-usage resupply directly. When material is transferred from raw inventory 205 to point of usage resupply 206-1 through 206-N, the material accounting system deducts the materials from raw inventory accounting (if the material was transferred from there) and places it in raw-in-process inventory accounting.

From point-of-usage resupply 206-1 through 206-4, material flows to line storage areas 207-1 through 207-6. Line storage areas 207-1 through 207-6 are physically located next to production paths 201 and 202 so that material is readily available for use in processes within production paths 201 and 202. In some cases, line storage areas 207-1 through 207-6 can be physically at the point in the production path where that material (i.e., the bolt, washer, fender, or other raw-in-process material) is actually used by a process. Additionally, point-of-usage resupply 206-1 through 206-4 may supply material to one or more point-of-usage resupply areas before reaching a point-of-usage at or near a production path where it is used in production of a product.

In order to insure that material is present at the time and in the place that it is required, a replenishment technique for material flow control is utilized. According to embodiments of the present invention, material is pulled to the process where it is needed substantially at the time it is needed and only an optimum amount of material is stored nearby. Material is pulled to a point-of-usage on the production path through a pull sequence. For example, in FIG. 2A a material at line storage 207-4 has a material pull sequence that includes point-of-usage resupply 206-3 and raw inventory storage 205. A pull sequence may include any number of points-of-usage between raw inventory 205 and point-of-usage 207.

In the context of material flow, the signal card replenishment technique refers to the use of a signal card for replenishment of material. The replenishment signal can, in general, be a card, a container, a container-based electronic communication, or a combination of multiple cards. When the replenishment signal card is attached to a container, the container with the card attached is referred to as a replenishment container. Each replenishment container holds, or refers to, a quantity of one type of material (e.g., a certain specific bolt or washer).

Figure 3:
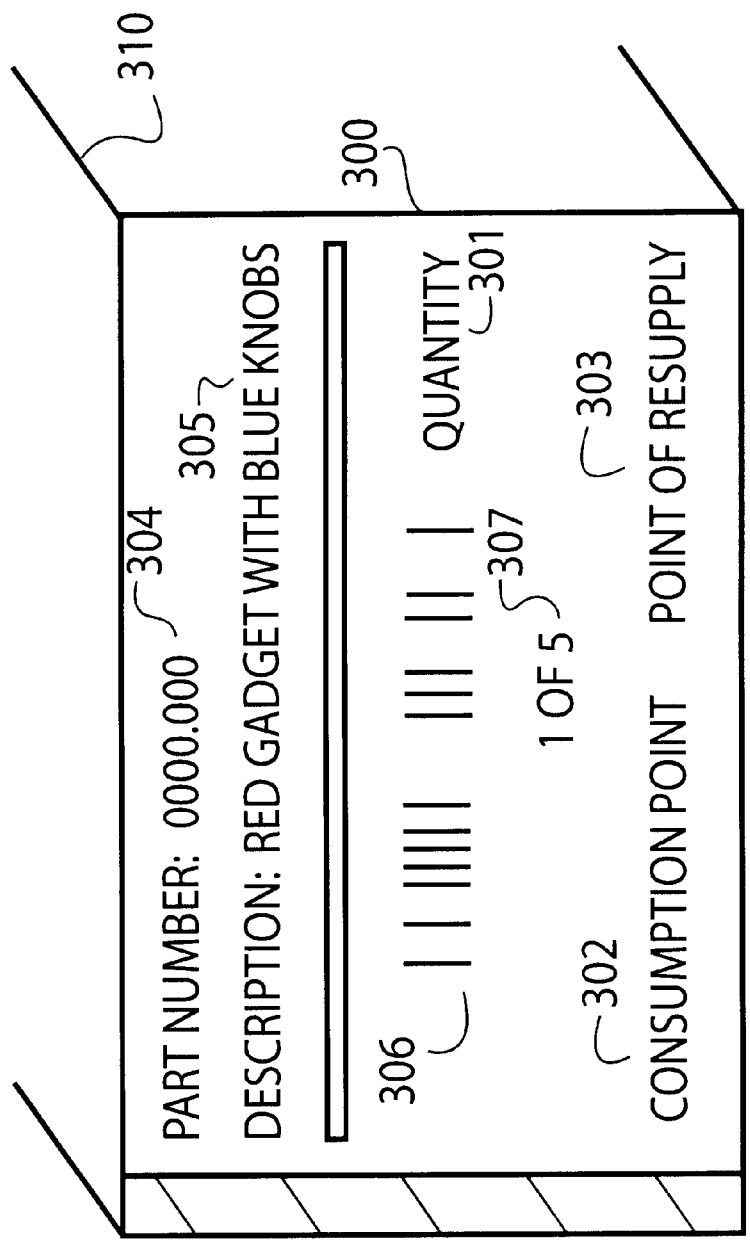
FIG. 3 shows an example of a replenishment signal card.

The basic replenishment signal is a card that shows point of usage (i.e., consumption point or point-of-usage resupply point), point of supply (i.e., point-of-usage resupply point or raw inventory), quantity of material, part number and description of the material. FIG. 3, for example, shows an embodiment of a replenishment signal card 300. Card 300 includes a content quantity 301, a consumption point identifier 302, and a point of resupply identifier 303. In addition, card 300 may also include a part number 304 and a material description 305 for the contents of container 310 to which signal card 300 is attached. In a multiple-card replenishment management system, card 300 also includes a card number 307 that indicates the number of replenishment signals to be received at the point-of-resupply indicated by point-of-resupply identifier 303 before action is taken to replenish the material at the point-of-usage identified by the consumption point identifier 302. Additionally, the card may be computer readable through bar graph 306 or by other computer readable mechanism (such as magnetic strip, for example) so that material design system 1 (FIG. 1) can be used to monitor the flow of material. In some cases, the amount of quantity in a container attached to card 300 is an estimate of the amount of material required to fill the container to a fill line located within a replenishment container, reducing the amount of non-value added work required to produce products using that material.

In FIG. 2A, line storage areas 207-1 through 207-6 can contain multiple replenishment containers, each having a replenishment signal such as card 300 (FIG. 3) attached to the replenishment container. Usually, a material handler is employed to roam the production line and pick up replenishment signals (i.e., replenishment containers) from points-of-usage indicated by consumption point indicator 307 and deliver them to the appropriate point-of-usage resupplies indicated by point-of-usage resupply indicator 303 on replenishment signal 300. The material handler also delivers refilled replenishment containers to line storage areas 207-1 through 207-6 as per the instructions indicated on the replenishment signal. In addition, material in point-of-usage resupply 206-1 through 206-4 is also stored in replenishment containers. The replenishment containers in point-of-usage resupply 206-1 through 206-4 have replenishment signals indicating that raw inventory storage 205 is the point-of-resupply and point-of-usage resupply 206-1 through 206-4, respectively, is the consumption point. In general, the replenishment pull sequence can be implemented through the entire material flow process from the supplier to the point-of-usage at a process on a production path.

Figure 4:
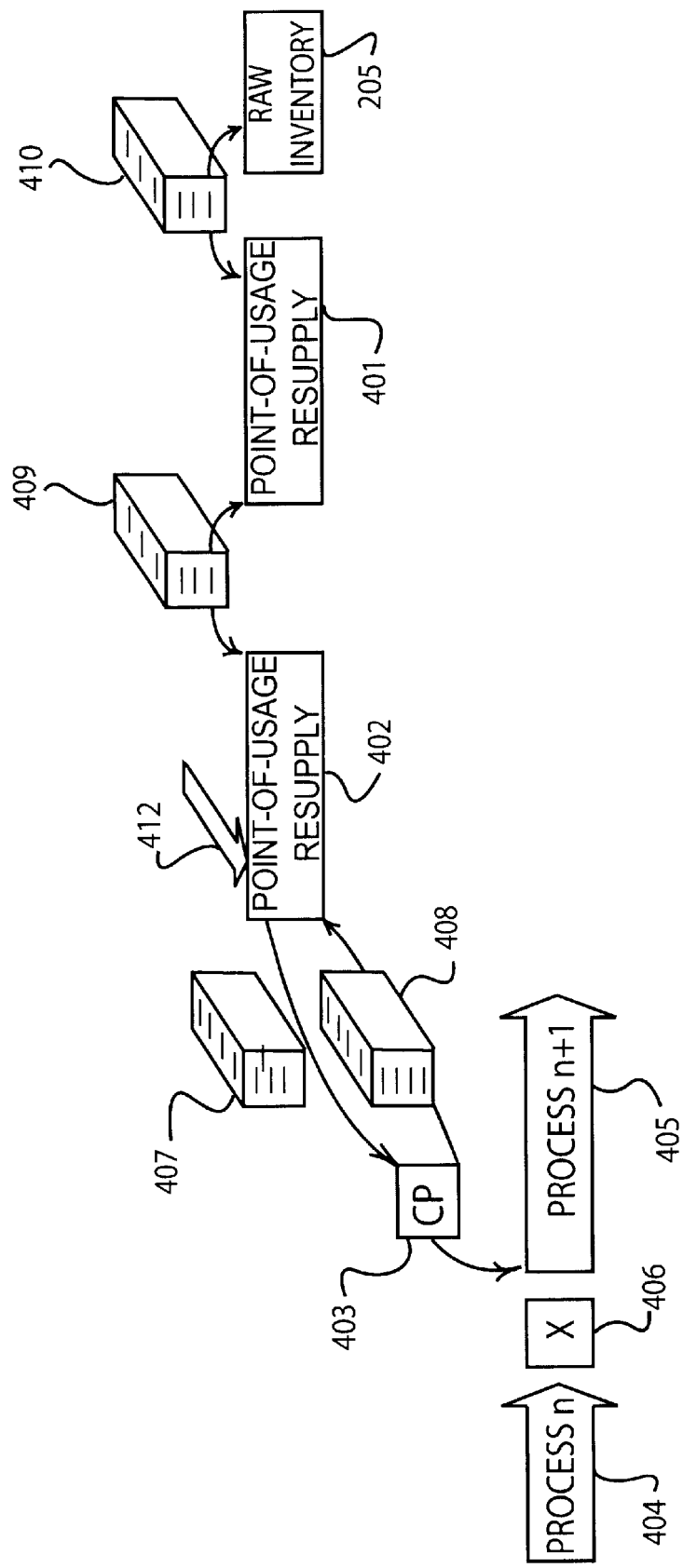
FIG. 4 shows an example of a process path and the material flow pull sequence to the process path.

There are three types of replenishment pull techniques: single card replenishment, multiple card replenishment or non-replenishable replenishment. Additionally, replenishment can be applied to either in-process product flow control or material flow to a production path. FIG. 4 shows a portion of a production path along with a material flow pull sequence to the production path. Process 405 uses material from point-of-usage storage point 403. Replenishment containers at storage point 403 pull material from point-of-usage resupply 402, which pulls material from point-of-usage resupply 401. Point-of-usage resupply 401 pulls material from raw inventory storage 205, which is supplied by outside suppliers. Process 405 also pulls product from process 404. Process 405 and process 404 represent the nth and (n+1)th processes in a production path, where n is an integer number less than the total number of processes in the production line.

In-process replenishment management refers to the replenishment style management that occurs in product flow between subsequent processes, for example processes 404 and 405, of a production path. In FIG. 4, the in-process replenishment signal is represented by signal 406, which could be as simple as one or more spots from which process 405 retrieves a unit of product. In that case, the signal for process 404 to replace the unit of product onto signal 406 is signal 406, i.e. when a unit of product is removed from signal 406, process 404 replaces it with another unit of product. In-process replenishment, then, is the management of product as it flows between processes of a production path. Single card, multiple card or non-replenishable replenishment management systems can be implemented between subsequent processes in the production path as needed. Material replenishment management, in contrast, refers to a replenishment method of managing material flow from outside vendors to a point-of-usage on a production path.

In single-card replenishment, the consumption of the contents of one replenishment container 310 (FIG. 3) will trigger replenishment of that replenishment container. In other words, when the material handler notices that the replenishment container is empty, it is returned to the point-of-resupply indicated by point-of-resupply identifier 303 of replenishment signal 300 attached to container 310 for replenishment. In FIG. 4, storage point 403 can include multiple replenishment containers for a single material. When one replenishment container is emptied, there is a second full replenishment container available at storage point 403 from which material is pulled in order to supply one or more points in process 405. Meanwhile, the empty first replenishment container is returned to point-of-usage resupply 402 and refilled with an amount of material that creates a full replenishment container. The full replenishment container is then delivered back to storage point 403. In a well designed materials handling system, the full replenishment container is returned to storage point 403 at the time the second replenishment container at storage point 403 is emptied. The second replenishment container is then returned to the point-of-usage resupply to be refilled. FIG. 4 shows empty replenishment container 408 being returned to point-of-usage resupply 402 and full replenishment container 407 being returned to storage point 403.

In a multiple card replenishment system, the empty replenishment container that is delivered to point-of-usage resupply 402 from storage point 403 is not immediately refilled and delivered back to storage point 403, as it is in a single-card replenishment system. Instead, multiple empty replenishment containers are held at point-of-usage resupply 402 until a certain number of empty replenishment containers accumulate before all of the accumulated replenishment containers are refilled and returned to storage point 403. Multiple-card replenishment is implemented for material flow management when the material is either produced by an independent manufacturing process or is purchased by a supplier in much larger lots than are actually used. An independent process path is a feeder path that normally produces components (or products) at a production rate different from the consumption rate at storage point 403.

Non-replenishable card creates a pull sequence for a component of material that is used on the line for one, usually custom, product production. In that case, the amount of material, the quantity, is calculated from a product sales order quantity in combination with a bill of material quantity. Non-replenishable card management is used most often for material that is seldom used and therefore is not efficiently stored in proximity to the production path.

In FIG. 4, a replenishment management system is instituted at each step of the material flow management system. Point-of-usage resupply 402 pulls material from point-of-usage resupply 401 using a replenishment management system. In addition, point-of-usage resupply 401 pulls material from raw inventory 205 using a replenishment management system. Replenishment techniques can also be used to pull inventory from the outside vendors into raw inventory stores 205.

Figure 5A:
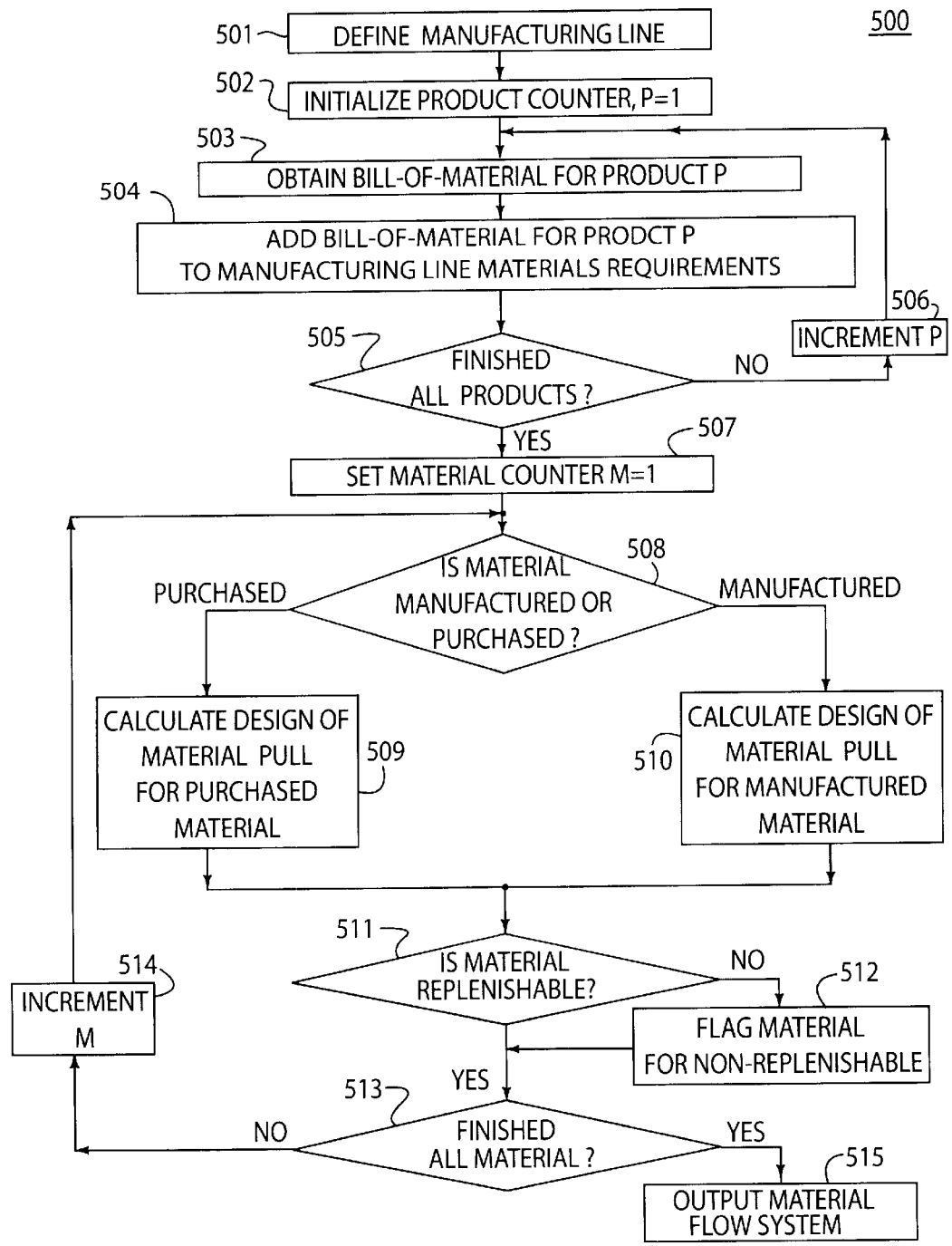
FIGS. 5A, 5B and 5C show a flow chart of a material flow design system according to the present invention.

FIG. 5A shows a flow chart of an embodiment of a replenishment management design system 500. The embodiment shown in FIG. 5 operates along with the method and system for designing a mixed-model manufacturing process, as described above and disclosed in U.S. application Ser. No. 09/186919, which has previously been incorporated into this disclosure. In some embodiments, replenishment management design system 500 is executed on design system 1 (FIG. 1) either after or contemporaneously with the mixed-model manufacturing process design system. Additionally, a material flow design system according to the present invention can be utilized with any manufacturing line design.

In step 501, the manufacturing line is defined. The entire manufacturing line in terms of process paths can be defined at this step. The mixed-model manufacturing line produces a family of products in a demand-flow process. The product and process definitions can be defined according to U.S. application Ser. No. 09/186919.

In many embodiments, the material flow design system described operates concurrently with the manufacturing line design system in step 501. The manufacturing line design system and material flow design system can be intertwined to form a single combined design system for concurrently designing both the manufacturing line and material flow to the manufacturing line.

In the embodiment shown in FIG. 5, as an example, the two design systems run sequentially so that the manufacturing line design is completed before the material flow design system is operated. Therefore, calculations of parameters associated with the manufacturing line design (e.g., demand-at-capacity values and takt times) are all completed before start of the material flow design system.

A product counter, P, is initialized in step 502. Product counter P is an integer that indicates one of the products manufactured by the mixed-model manufacturing line.

In step 503, a bill-of-material is obtained for product P of the family of products produced by the manufacturing line. The bill-of-material for a product is defined as that material that is included in one unit of the product. For example, a bicycle requires two wheels, one seat, one frame, one handlebar, one front sprocket, one rear sprocket, a chain, and a pair of pedals. The bill-of-materials for the bicycle, therefore, includes the two wheels, one seat, one frame, one handlebar, one front sprocket, one rear sprocket, a chain, and a pair of pedals. The bill-of-materials for each product can be inputted to the system by an operator at this point, or it can be previously determined during step 501. In some embodiments, bill-of-materials for each product may be inputted as part of the manufacturing line design (e.g., when individual processes are defined, materials requirements for those processes can also be inputted). In some embodiments, the bill-of-material for each product can include the process identification of where that material is used in the manufacturing line in order to produce the product.

In step 504, the bill-of-materials for product P is summed into a manufacturing line materials requirement. The manufacturing line materials requirement is a compilation of the material required at each process of the manufacturing line in order to produce the demand-at-capacity amount of product. Therefore, the material included in the bill-of-materials for product P is multiplied by the demand-at-capacity for product P at each process in the manufacturing line and summed with the material requirements at each of the other products at each process.

As an example, consider that process 405 (FIG. 4) is the process of placing the front wheel on a bicycle and process 404 is placing the seat on the bicycle. Assuming that the manufacturing line produces two types of bicycles, bicycle 1 and bicycle 2, which differ by frame construction but not by seats or front wheels. Assume further that the demand at capacity at both of processes 404 and 405 for bicycle 1 is 50 and for bicycle 2 is 75. The manufacturing line materials requirements, then, would include 125 wheels at process 405 and 125 seats at process 404. Additionally, a compilation of all of the material required by the manufacturing line is included in the manufacturing line materials requirements. Therefore, for example, if the front wheel of the bicycle is the same as the rear wheel of the bicycle then the manufacturing line requirement for bicycle wheels includes 250 wheels for the bicycle 1 and bicycle 2 products.

In step 505, the design system 500 checks to see if the materials requirements of all products produced by the manufacturing line has been included in the manufacturing line materials requirements. If not, then the product counter P is incremented in step 506 and the system returns to step 503. If all of the products have been included, then the manufacturing line materials requirements is complete and the system now has stored the material needed at each process in order that the manufacturing line produces the demand-at-capacity amount of product as well as compiled a complete list of all materials required by the manufacturing line.

In step 507, a material counter M is set to 1 in order to point to a first material. In system 500, M is set to sequentially point at each material listed in the manufacturing line materials requirements. In step 508, the system determines whether material M is purchased from a supplier or manufactured by an independent production path of the manufacturing line. If the material is purchased, the material flow for material M is determined at step 509. If the material is manufactured, the material flow for material M is determined in step 510.

Figure 5B:
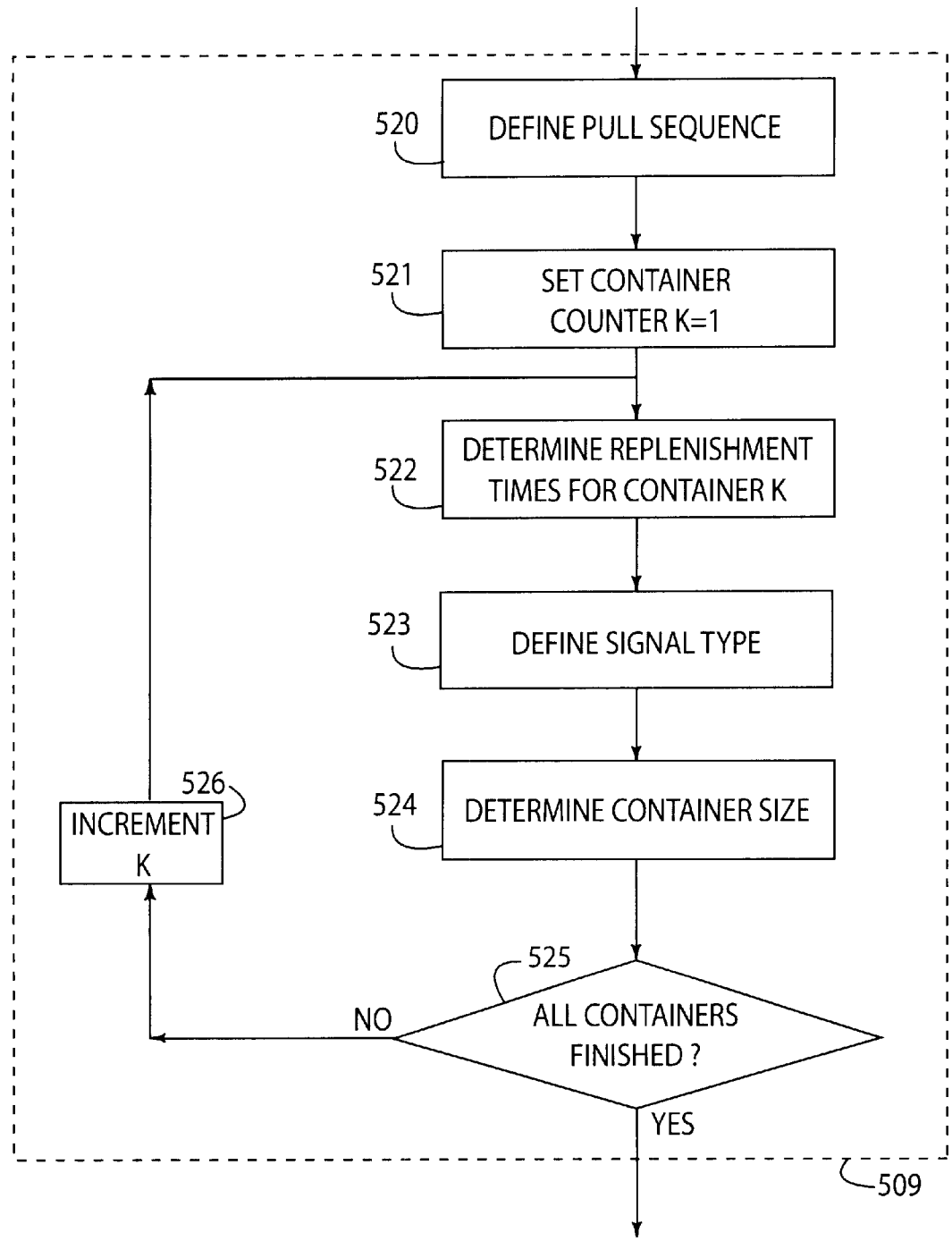

FIG. 5B shows a block diagram expanding the procedure for calculating the material flow for purchased material, step 509 of FIG. 5A. In step 520 of FIG. 5B, the material pull sequences (i.e., material flow) to the production process path that produces the products is defined. The pull sequence of materials determines how material flows from raw inventory 205 (FIG. 2) through the plant and to the manufacturing line. For example, in FIG. 4 process 405 can be the process of applying a front wheel to a bicycle. In that case, units of bicycles are advanced from process 404 to process 405 and process 405 requires a wheel. The wheel is pulled from a replenishment container 407 for wheels located at storage point 403. The replenishment container includes a number of wheels and, when it is emptied, is returned to point-of usage resupply 402 for replenishment. If the same material is used at other process, for example if process 404 also requires a wheel, then another replenishment container for that material will reside at a point-of-usage close to process 404. In some designs, point-of-usage 403 may be positioned to supply both process 404 and 405, in which case the material usage for both of those process are combined into one material requirement at point-of-usage 403. Point of usage resupply 402 may provide material for process 404 as well as process 405. Note that a replenishment container may simply be a spot at point-of-usage 403 for placement of bicycle wheels, for example, and a signal card signifies the number of wheels at that spot.

Material pull sequences are defined based on ease of use of the resulting replenishment containers, the number of material handlers, the accessibility of storage locations at storage point 403 and point-of-usage resupply 402, supplier delivery methods, and whether the material is purchased or whether it is manufactured on site. Definition of the pull sequence, therefore, is determined by system 500 based on the material needs of the processes of the manufacturing line, the location of point-of-usage storage points (such as point-of-usage 403 in FIG. 4), the physical locations of point-of-usage resupply (such as point-of-usage resupply 402 and 401) and the physical location of raw-inventory 205. In one embodiment, the system determines the storage points 403 physically closest to the processes, determines point-of-usage resupply point or points that optimize the supply of all storage points 403 for that material (e.g., determines the resupply points that allow the desired amount of material at the storage point between avoidable replenishment times), and defines the pull sequence from the raw-inventory 205 to the point-of-usage resupply point or points to the storage points 403. In most embodiments, the operator of system 500 monitors the pull sequences and can modify individual pull sequences at the operator's discretion.

Defining the pull sequence results in the definition of storage locations for a group of resupply containers and locations from where those resupply containers are to be resupplied. For example, in FIG. 4 the pull sequence includes a container 407 at point of usage resupply 403. Container 407 is stored at point of usage resupply 403 until empty and then returned to point-of-usage resupply 402 (as empty container 408) for refill. Container 408 is refilled from another resupply container 409 that is located at point-of-usage resupply 402 and resupplied from container 410 at point-of-usage resupply 401. Container 410 is resupplied from raw inventory 205. In general, a resupply container can be any physical place in which to store material, including boxes, bags, or simply a space within a point-of-usage where material is stored.

In FIG. 5B, once the pull sequences have been defined in step 520, a container counter K is initialized to 1 in step 521. The container counter sequentially indicates each of the containers involved in the pull sequence of material M (see FIG. 5A). In step 522, the replenishment times, R, for replenishing container K is determined. The time for replenishment, R, is the time between subsequent replacements of a replenishment container. For example, a materials handler may check consumption point 403 once every 2 hours. In that case, an empty replenishment container is picked up and, 2 hours later, replaced with a full replenishment container. In that case, R is 4 hours. The number of hours of production in a day is H. Therefore, the number of times that a replenishment container can be replaced in a day is H/R.

In step 523, the signal card (such as signal card 300 of FIG. 3) is defined for container K. The signal card, as is card 300 of FIG. 3, includes the material part number 304 (identifying the material), consumption point identifier 302, point of resupply identifier 303, and quantity 301. Note that if the material in the replenishment container is consumed at point-of-usage resupply 402, then consumption point 302 refers to point-of-usage resupply 402. Signal cards may be attached physically to the replenishment container if the replenishment container itself is transported to its point-of-usage resupply. Otherwise, only the signal card itself need to be transported to the point-of-usage resupply to indicate a need to replenish the replenishment container.

The system then proceeds to container sizing 524. Sizing the replenishment container refers to determining how many units of material are required to be resupplied in each replenishment container at the consumption point of interest (i.e., storage point 403 or point-us-usage resupply 402 and 401 in FIG. 4). The size for a single card replenishment container is determined as $$Qty = \frac{\sum (Dc * Q) * R}{(H * P)}(1 + SF), \qquad (1)$$

where Dc is the demand-at-capacity (usually measured in one day), Q is the point-of-use consumption quantity, R is the replenishment time, H is the available time for replenishment, P is the amount of material in each package of material, and SF is a built in safety factor.

The demand-at-capacity for material at a given process is defined to be the same as the demand-at-capacity for each product at the process being serviced by the replenishment container. Therefore, the demand-at-capacity for product at process 405 (FIG. 4) is the amount of product that must enter process 405 in order to yield the required overall demand-at-capacity at the end of the production path. The demand-at-capacity for material is the amount of material required to produce that amount of product. For example, if 130 units of product are required to enter process 405 in order to yield 100 units of product at the end-of-line, where 100 units of product is the demand-at-capacity of the production path, then material for 130 units of product is the demand-at-capacity for material at consumption point 403.

The parameter Q is the number of material units in one unit of product. For example, if process 405 is the process of mounting two wheels on a bicycle and the replenishment container under investigation holds wheels for the bicycle, then Q is two (2) because two (2) wheels are required at consumption point 403 in order to produce one (1) bicycle. The quantity Dc * Q, therefore, indicates the demand at capacity for material M at container K.

The sum over the demand-at-capacity times the quantity Q indicates the total amount of material required by the manufacturing line at container K. The amount of material required for a point-of-resupply container is a sum of the amounts required at each of the point-of-usage replenishment containers that directly pull material from that point-of-resupply container. In some embodiments, if a point-of resupply provides the same material to several points-of-usage and the container sizing is different for each of the several consumption points, then one container size is chosen and the containers at the remaining consumption points are sized to be the chosen container size so that the container sizing is convenient, i.e. excessive material handling and counting can be avoided.

The parameter P is the number of units in a package. When available, whole packages of material are used in order to reduce the overhead of counting out individual units of material. For example, if the material is bolts and bolts come in packages of 100 then, for convenience, the replenishment container should be designed to hold multiple units of 100. For loss of inventory (because bolts or screws often are dropped and lost in the production process), a safety factor SF is often included into the size of the replenishment container. The safety factor will be different for each material.

In optimum conditions, the calculation given by equation 1 will yield a replenishment container sized such that empty replenishment containers appear exactly when the materials handler appears to remove them and full replenishment containers appear exactly when the next replenishment container is emptied.

Additionally, if material is ultimately purchased in large bulk but used in much smaller bulk, it may be advantageous at some point in the pull sequence to use a multiple-replenishment signal system. In that case, material is purchased in much larger batches than is reasonable for the size of a replenishment container. In that case, the replenishment container can be sized to a quantity such that an integral number of the quantity uses the entire batch of material. The point-of-usage resupply, therefore, replenishes the replenishment containers from one batch when the integer number of replenishment containers are returned.

Multiple card replenishment may be utilized when material becomes available at a point-of-resupply in the pull sequence in quantities much greater than the quantities required at the next consumption point. For example, in FIG. 4, assume that a replenishment container at point-of-usage 403 is sized to contain 100 bolts, but the lot size of bolts that are supplied to point-of-usage resupply 402 is 1000 bolts, it may be more efficient to hold 10 replenishment containers at point-of-usage resupply and pull one lot of 1000 bolts from point-of-usage resupply 401. Therefore, a 10 card replenishment system can be utilized where empty replenishment containers are removed from point-of-usage 403 and delivered to point-of-usage resupply 402 until 10 empty replenishment containers have accumulated. In that case, one lot of 1000 bolts is used to fill the 10 empty replenishment containers and they all are delivered back to point-of-usage 403. In addition, another lot of 1000 bolts is pulled from point-of-usage resupply 401 in a single card replenishment management scheme.

The decision of whether to use single card replenishment or multiple card replenishment management schemes under these circumstances depends on a number of factors, including lot size disparity, storage availability, the size of material components, independent production paths for production of the material components (setup times, run times, batch quantity based on machine design), replenishment time frame, container methods, and move quantities.

In step 525, step 509 determines whether all of the replenishment containers in the pull sequence defined in step 520 have been processed. If not, then container counter K is incremented in step 526 and step 509 returns to step 522. If all replenishment containers have been processed, step 509 returns to system 500 of FIG. 5A.

Figure 5C:
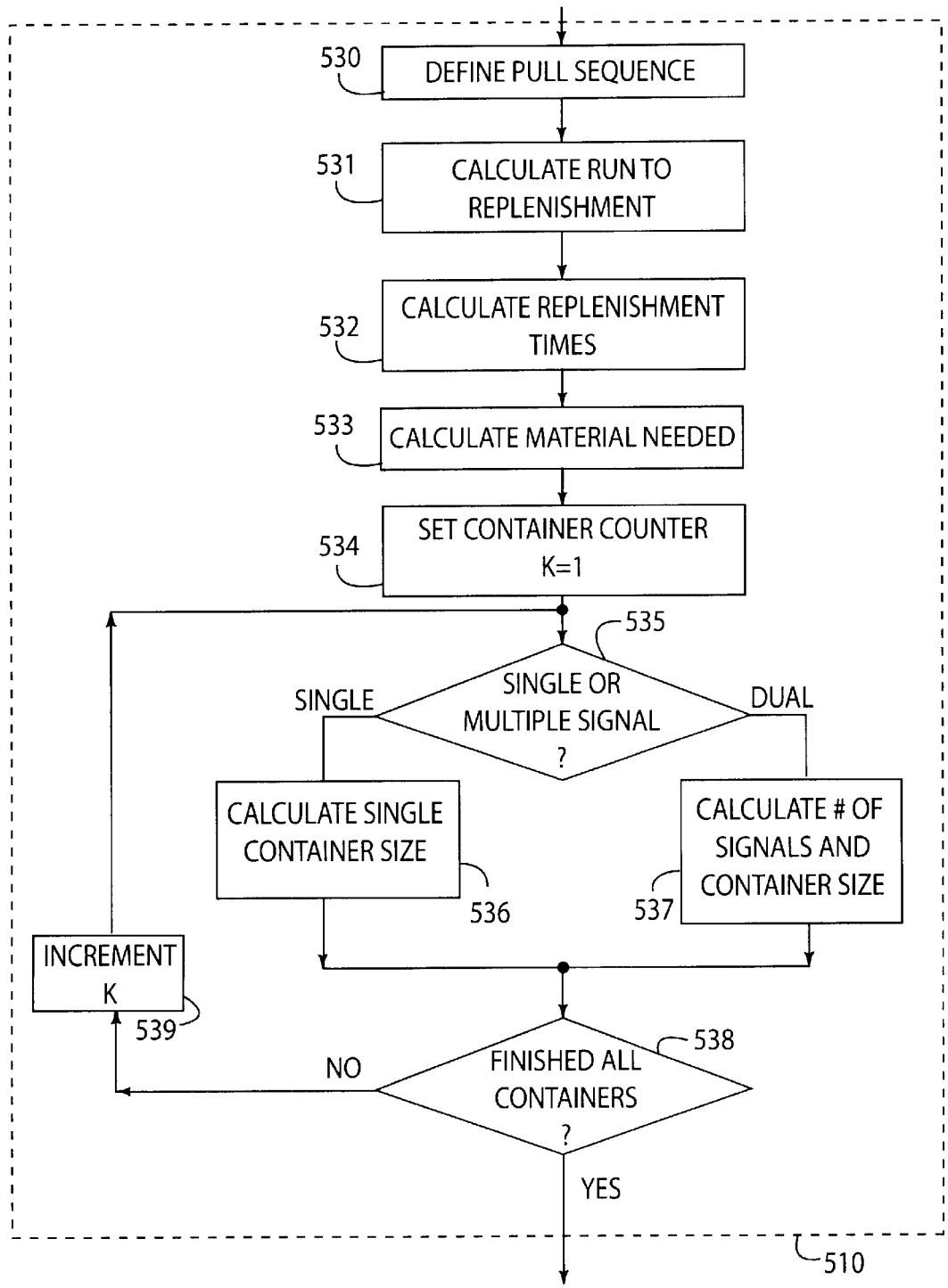

If step 508, FIG. 5A, determines that material M is manufactured by an independent production path, then replenishment container and signal definitions are accomplished in step 510. If an independent production path is utilized to produce material components, then the number of signal cards and how often the production path is operated needs to be calculated. FIG. 5C shows individual steps of step 510. In FIG. 5C, step 530 defines the pull sequence for material M.

An example pull sequence including an independent manufacturing process for material to the manufacturing line is

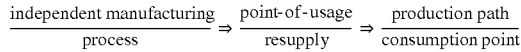

In FIG. 4, for example, independent production path 412 supplies material to point-of-usage resupply 402. Point-of-usage 403 can, then, pull this material from point-of-usage resupply 402. In some material flow systems, independent production path 412 can supply point of usage 403 directly. Several analyses are required to calculate the replenishment quantities to suit this environment.

In step 531, the run to replenishment quantity, Kc, is calculated. The run to replenishment quantity, Kc, is the lot size to be manufactured by the independent process path and is calculated to be a minimum amount of material to produce that recovers any set-up time performed within the production path. The independent process produce quantity, Kc, is given by $$Kc = \frac{\sum (Su + Rt)}{takt - Rtp}, \tag{2}$$

where Su is the set-up time per resource for a production run in the independent production path, Rt is the run time per component of material per resource, takt is the operation cycle time for the production path, and Rtp is the run time of the pacing machine for the independent production path. The pacing machine is the slowest machine in the independent production path. Note that because the takt time is the maximum amount of time that a process can utilize Rtp is less than takt.

In step 532, the independent process replenishment time is calculated. The independent process replenishment time R is given by $$R = \Sigma(Su+Rt)+Rtp*(Kc-1)+(\text{move time}) \tag{3}$$

The independent process replenishment time is the total time required for the independent process path to produce Kc number of material components. Again, Su is the set-up time for a production run, Rt is the run time per component of material (Su+Rt), therefore, is the time to produce one component in the production path), Rtp *(Kc−1) is the amount of time required to produce Kc−1 components of material after the first one has already been produced. The move time refers to the amount of time required to move material components from the end-of-line of the independent production path to the replenishment point.

In step 533, the amount of material needed during the production run is calculated. The amount of material required during the production run, $K_R$ is given by $$K_R = \frac{\sum (Dc*Q)*R}{H*P} \tag{4}$$

where Dc is the demand-at-capacity (usually measured quantity per day) for products utilizing the material at the container, Q is the point-of-use consumption quantity (i.e., the amount of material present in one unit of product), R is the replenishment time, H is the available time for replenishment, and P is the amount of material produced in a production run. The quantity required to be replenished at the container, therefore, is given by $K_R$.

In step 510, step 535 decides whether to use a single or dual signal card system by testing whether $K_R$ is less than Kc. If $K_R$ is greater than Kc, which is the minimum amount of product that can reasonably be produced with the independent production path, a single card signal system is indicated. Step 510, then, proceeds to step 536 where a single card signal is defined and the container size is set to $K_R$. The single card signal, as in signal card 300 of FIG. 3, may include part number 304, product description 305, container size (quantity) 301, consumption point identifier 302, and point-of-resupply identifier 303.

If $K_R$ is less than Kc, then step 535 decides that a multiple signal replenishment card is desirable. In that case, step 510 proceeds to step 537 for signal card definition and container sizing.

The result of the replenishment cycle is to fragment the demand created from the consumption of material on the independent production path and optimize the amount of material held on the floor of the manufacturing plant. The total number of replenishment containers in the multiple card replenishment management system between the point-of-usage resupply and the independent production path is calculated as $$\#\text{cards}=Kc/K_R. \tag{5}$$

The independent process quantity Kc is divided into a convenient quantity for each replenishment container and the replenishment card for each container is labeled to indicate a replenishment card number and the total number of replenishment cards (i.e., 1 of N). This definition defines the replenishment cards that are used with the multiple card replenishment management system.

Figure 6:
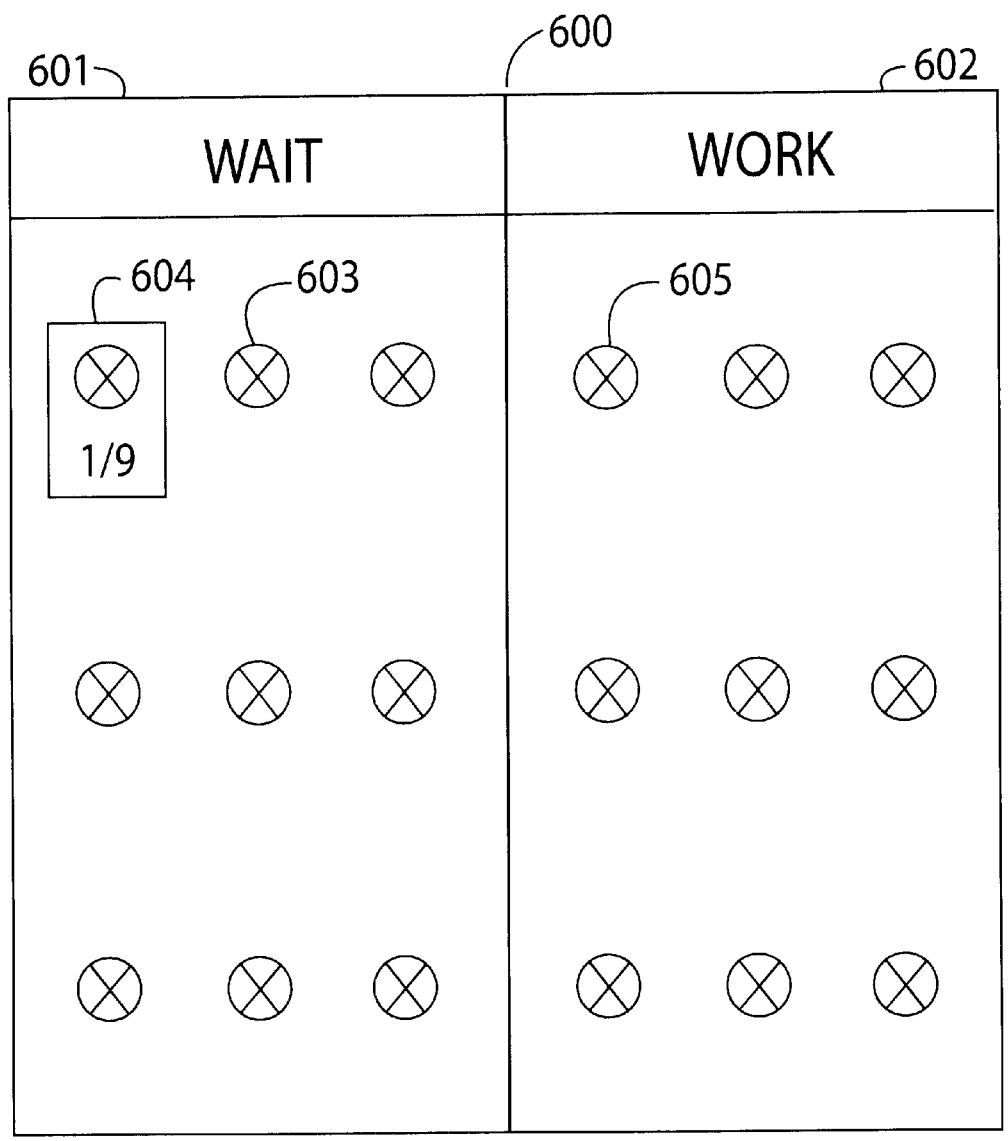
FIG. 6 shows a wait/work board for a multiple card replenishment management system from an independent production path.

In some embodiments, the multiple card replenishment management system is effectuated by a sequence control board located in the independent process path. FIG. 6 shows an example of a wait/work board 600 that can be used in this fashion. Wait/work board 600 is segregated into a wait portion 601 and a work portion 602. As material is consumed at a point-of-usage on the production path, the single card replenishment containers at point-of-usage 403 (FIG. 4) are exhausted and material is replenished from point-of-usage resupply 402. The point-of-usage resupply 402 can pull material from an independent production path 408. In that case, a produce replenishment card is transferred from the point-of-usage resupply and placed on wait portion 601 at one of the nine (9) spots 603. Wait portion 603 may include any number of spots to indicate any number of replenishment signals. The produce replenishment card 604 defines how many cards are in a set of cards and, when the set is full, the entire set is moved to work portion 602 of wait/work board 600. The set of cards is placed in the sequence behind any cards already on work portion 602 of board 600. The independent production path then produces the appropriate quantities of product for each card and refills the replenishment containers at the point-of-usage resupply.

Once the replenishment container is sized and the signal card or cards are defined, either in step 536 or step 537 of FIG. 5C, then step 510 proceeds to step 538. In step 538, step 510 determines whether all replenishment containers defined by the pull sequence determined in step 530 have been processed. If not, then the container counter K is incremented in step 539 and step 510 returns to step 535. If all containers have been processed, then step 510 exits.

In FIG. 5A, once the material pull sequence has been defined in either of step 509 or 510, system 500 proceeds to step 511. In step 511, system 500 determines whether the material is replenishable or not. If material M is a non-replenishable material, which is usually determined by data input, then system 500 proceeds to step 512. In some embodiments, system 500 may proceed directly from step 507 to step 512 if the material is non-replenishable material.

In non-replenishable replenishment, the replenishment quantity is defined as the amount of material required at each replenishment container in order to satisfy a particular sales order. In general, non-replenishable replenishment refers to materials that are not held in normal replenishment management at the production line. These components may be of low volume or sporadic demand, subject to damage or spoilage, require specialized storage requirements, be especially large, or otherwise are inconvenient for storage at or near the production path. The total amount of a material required to produce the amount of product ordered in a sales order is given by $$\text{component qty} = \text{product sales order quantity} * \text{bill-of-material quantity}. \qquad (6)$$

The component qty, then, is split between individual non-replenishable replenishment containers and sent to individual points-of-usage where it is used. The replenishment signal is typically distinctly different (e.g., a different color) from other replenishment signals used with the facility. Non-replenishable signals can also be used, if required, to prompt procurement of the component material from a supplier if the material is not held in inventory in a stockroom, such as raw inventory 205 (FIG. 2A).

When the material held in non-replenishable replenishment is available at storage points on the production path, the sales order amount of product is released to the production path to be manufactured. The non-replenishable replenishment card is used to pull the material for point-of-usage resupply only when it is required at the point-of-usage and then the card is removed from the management system.

The creation of the replenishment management system can be supported by the management control capability to maintain the accuracy of the replenishment sizes to suit the changing business climate. In particular, the monitoring of the bill-of-material records for all products being manufactured is critical to the support of replenishment management due to the interpretation of the point of use quantity provided from the bill-of-material record source. Bill-of-material structures are subject to engineering changes to ensure improvements to the products. Such changes often impact the materials used to build the products, either by change to the actual component material designated or the point of use quantity defined. When such changes are made, the replenishment management system must be updated to reflect the changes made. The update is essential to ensure the correct maintenance of the replenishment card information that will control the supply of the correct material to the manufacturing production path. Such control will normally require the application of software code that is implemented with a mixed-model manufacturing line design system that has been previously discussed.

Inventory Control—Backflush and Deduct Point Management

Inventory control is accomplished in three phases. The first phase is the raw materials inventory. This inventory, shown in FIG. 2 as raw inventory 205, is the inventory stored outside of the manufacturing area 200, usually in a storage location. When material is moved into the manufacturing area, it is often placed in point-of-usage resupply such as, for example, point-of-usage resupply 206-1 through 206-4. At that point, the material is deducted from the raw inventory accounting and placed on a raw-in-process inventory (RIP). The inventory, whether it be the raw-in process inventory or a point-of-usage resupply inventory, defines a deduct point. Finally, when the product is completed at the EOL of production path 201, the bill-of-materials for that process is deducted (i.e., or backflushed) from the RIP inventory and a unit of product is credited to the finished goods inventory.

The material backflush/deduct point management method provides the capability of establishing component and material consumption points to a designed manufacturing line. Intermediate backflush locations represent the positions within a production path where reporting of material consumption may be completed to initiate relief of the inventory records from their deduct points to an inprocess deduct point. The final backflush location in the manufacturing process is at the end-of-line, where the product is ready to transfer to the finished goods inventory. The deduct points define, for example, whether to relieve inventory or register the consumption of materials from a supplier consignment, or to credit the material to a scrap inventory.

The deduct points can represent the normal use of components and materials or they can report the creation of a scrap quantity of the product or partially produced product. The solution to the work order elimination within production, typical of a scheduling system of manufacturing, is to identify backflush and deduct points with the definition of the product part numbers. In embodiments of the invention, there is a defined location identity, normally a description of a point in the material pull sequence, associated with the material that will be backflushed at the inventories at that deduct point. The quantity of these components or materials will also be defined. The quantity may be the total quantity of that material consumed in the production of one unit of final product or it may be only a partial quantity of the material consumed in the production of one unit of final product.

Figure 7:
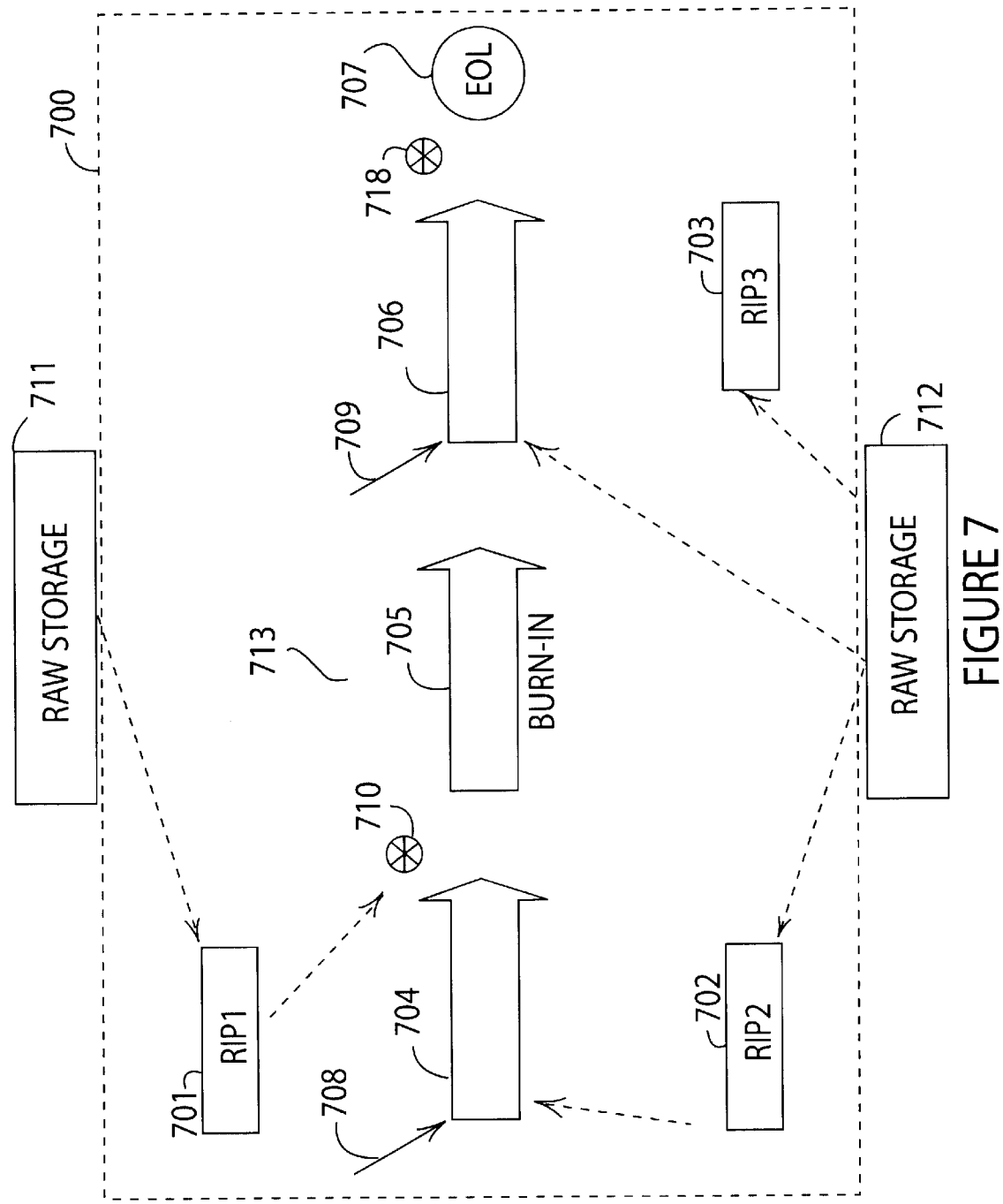
FIG. 7 shows an example of a process path and backflush and deduct point inventory control.

FIG. 7 shows an example of a manufacturing line 713 of manufacturing floor 700. Manufacturing line 713 includes main processes 704, 705 and 706 and feeder processes 708 and 709. Processes 705 can be, for example, a chip burn-in process which takes a large amount of time to accomplish for each product in comparison with the times to process a unit of product through other processes of the manufacturing line. Material is brought onto manufacturing floor 700 from raw storage 711 and 712 and then is pulled to manufacturing line 713 through replenishment storage sites, point-of-usage resupplies, at RIP 701, 702 and 703.

Figure 8:
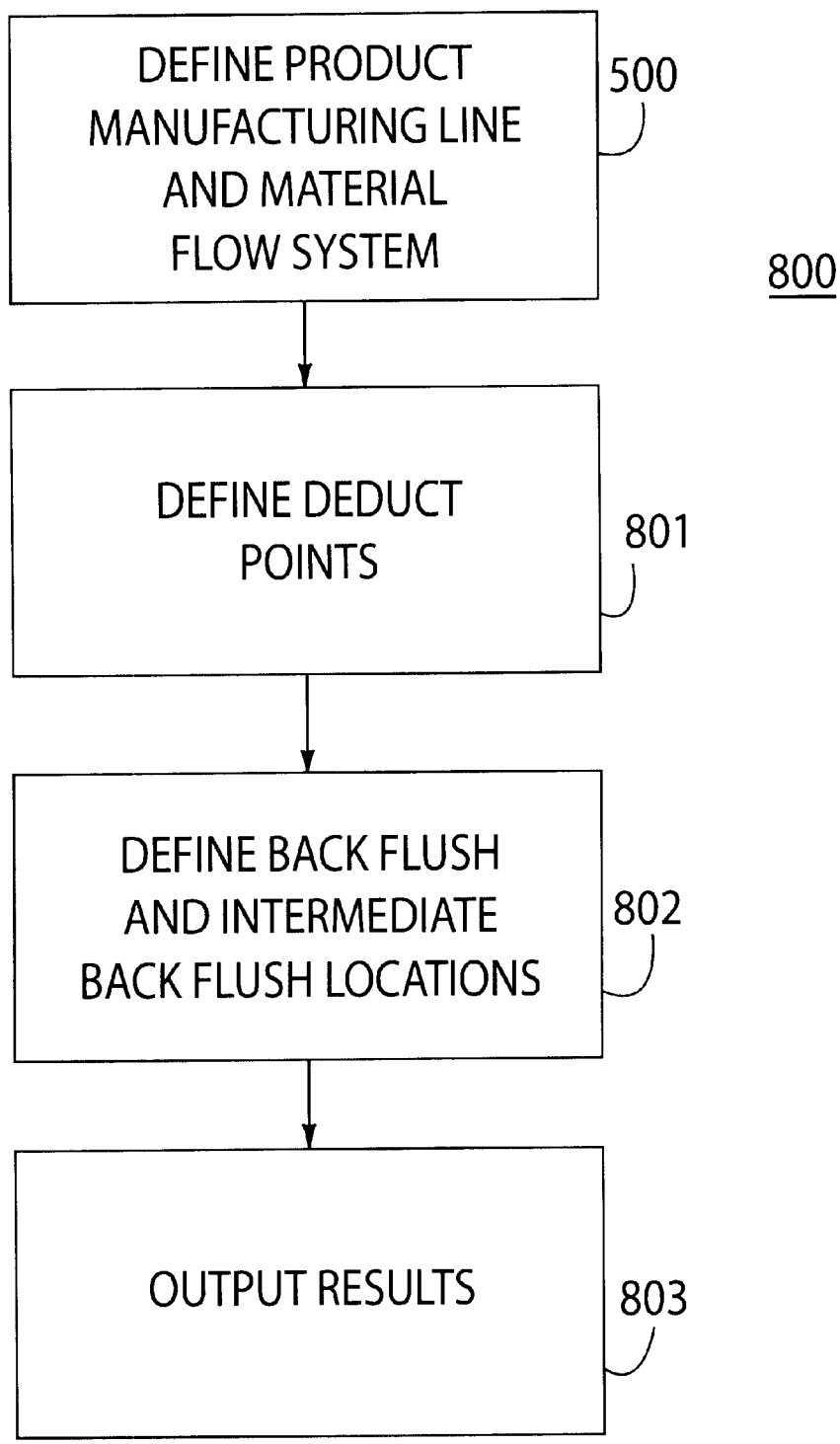
FIGS. 8 shows a flow chart of a deduct point management design system.

FIG. 8 shows a flow chart for an inventory design system 800 which defines deduct points and backflush locations according to the present invention. In FIG. 8, the material flow is defined in step 500 by system 1 (FIG. 1), for example, according to that shown in FIG. 5.

At step 801, deduct points are defined. The deduct points are chosen based on the pull sequences defined in the material flow system of step 500. Deduct points may be physically located at, for example, point-of-usage resupply 206-1 through 206-3 (FIG. 2) or, in FIG. 7, RIP 701 through 703. The deduct point is the point from which material inventory is deducted when a product passes a backflush point in the production path. Deduct points, as defined, can trigger credits of material to other accounts in the inventory control system such as, for example, scrap inventory, consignment inventory, or a holding inventory. In FIG. 7, deduct points may be defined to deduct inventory from RIP inventory at RIP 701, 702 and 703.

A backflush point is identified in relation to the manufacturing process path that is associated with the material pull sequence that the deduct point will serve. Each deduct point is defined by the component or materials identification, the quantity of material to be deducted and the inventory functional area and location from which that quantity of material is to be deducted. Normally, several different components of materials are linked to a deduct point. In some embodiments, a further definition of a scrap quantity to the definition of each of the material part numbers is implemented, providing a method to identify where scrap is expected as part of the manufacturing process. The result of the deduct point definition is to identify the deduct points together with the material that will be backflushed at those deduct points. In addition, the actual functional area and location that will be relieved by the backflush process is identified when creating inventory transactions.

In FIG. 8, backflush locations and intermediate backflush locations are defined in step 802. A backflush always occurs at the end of line, for example backflush 718 occurs at EOL 707 in FIG. 7. Intermediate backflush locations, such as intermediate backflush 710 in FIG. 7, can also be defined, usually related to scrap locations, long processes, or easy ability to count materials at that location.

The definitions of default backflush deduct points can be inputted as part of, or along with, the part number definitions for the material. The default definitions that are created during the part number definition within a computer system are used unless overridden during deduct point definition. They are also used as the default functional area and location for backflush of the final product completion at the end of the production process. The use of these default definitions are very useful and time saving during deduct point definition.

As the product passes through the production path (such as production path 713 in FIG. 7), completion of a process for an amount of product corresponding to production of one unit of final product triggers deduction of the materials linked to the production of that product from the RIP inventory and credit of that material to an accounting defined by the deduct point at the RIP inventory. The deduction point may be either for normal production accounting or for scrap reporting. If a deduct point is not reported during production, the backflush inventory adjustment is undertaken at the point of final production, when the product is credited to the finished goods inventory. In FIG. 8, once the backflush and intermediate backflush locations are defined in step 802, accounting inventory system 800 outputs the design results and exits at step 803.

Figure 9:
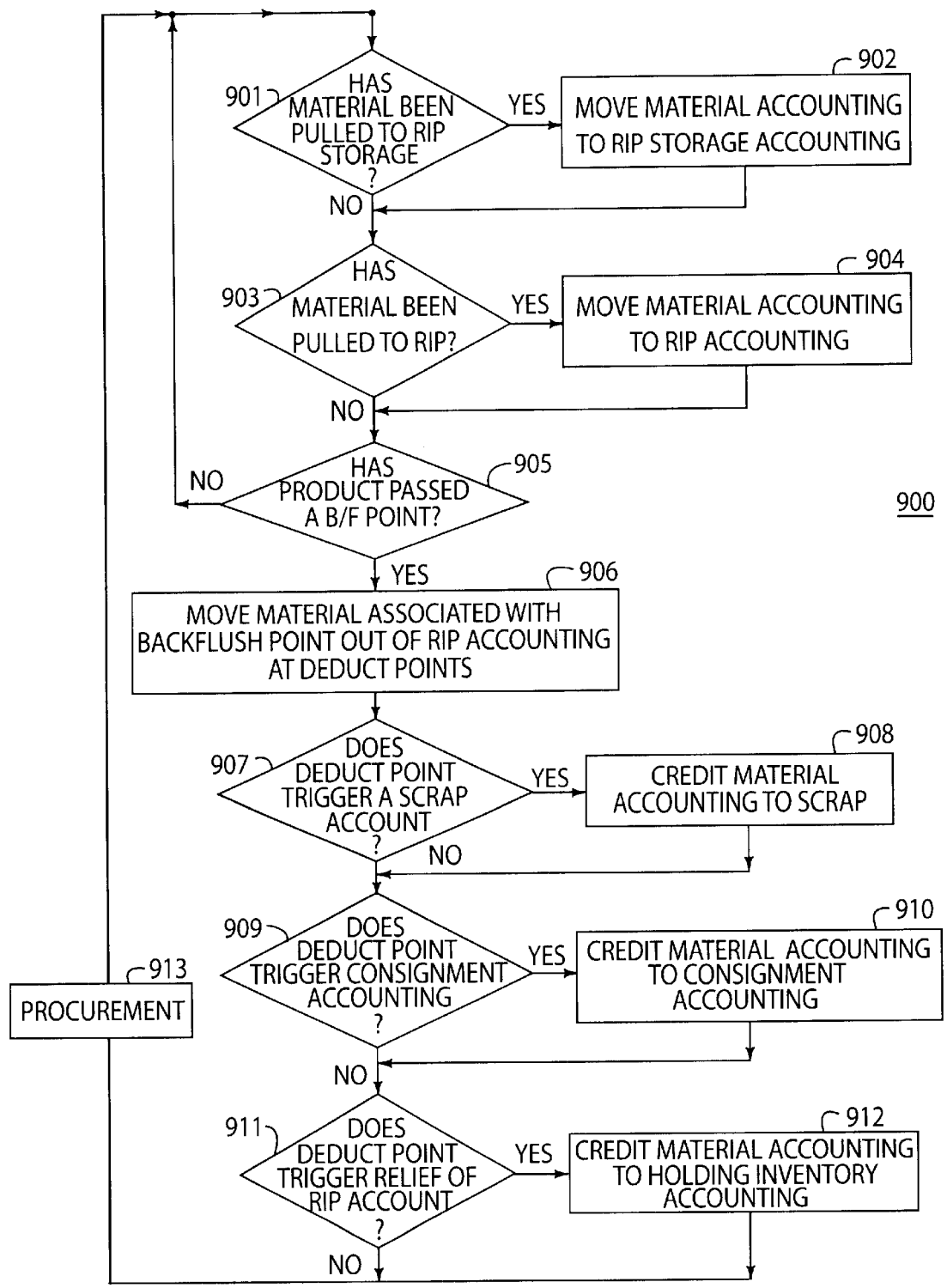
FIG. 9 shows a flow chart of an inventory monitory system according to the present invention.

FIG. 9 shows a flow chart for a monitoring program 900 for inventory control according to the present invention. In manufacturing, material is delivered to the production path in response to replenishment signals for replenishment using replenishment management techniques, as was previously discussed. This technology provides unallocated materials at the point of use in the production path based on consumption of material by the production path. Monitor system 900 checks to see if material has been delivered to the manufacturing plant in step 901. If material has been delivered, then it is credited to raw inventory accounting in step 902.

In step 903, system 900 determines whether material has been pulled from raw inventory storage to RIP storage, or point-of-usage resupply points. If material has been pulled to RIP, then material is credited to RIP accounting in step 904. As the materials are transferred from a raw inventory storage area (storage 711 and 712 in FIG. 7, for example) to the point-of-usage resupply areas (RIP 701 through 703 in FIG. 7, for example), an inventory transaction occurs shifting the materials credited to raw storage inventory accounting to the RIP inventory accounting. This transaction does not impact procurement of new material because the material is credited to either raw inventory accounting or RIP inventory accounting and the material is still available to fill the material requirement. Material is not relieved from the RIP inventory record when it is delivered to the production floor.

In step 905, system 900 determines whether or not product has passed a backflush point. When a product reaches a backflush location in the manufacturing process path and is detected in step 905, the system 900 reports the quantity of product to the deduct points associated with the backflush location. In step 906, the amount of material indicated by the deduct points is deducted from RIP inventory accounting. Material is deducted at each deduct point associated with the backflush point (or points) detected in step 905.

Step 907 determines, for each deduct point, whether the deduct point triggers a scrap accounting and, if so, an amount of material determined by the deduct point is credited to a scrap inventory in step 908. Step 909 determines whether the deduct point triggers a consignment inventory and, if so, material is credited to consignment inventory in step 910. Consignment inventory is inventory held on a manufacturer's site that is owned by a supplier and paid for at the time of material usage. The object is to lower inventory investment prior to actual material use. A purchase order is utilized to procure material over a defined time period. As material is used within the manufacturing facility, this usage is recorded and the purchase order is updated and accounts payable activity is initiated. The backflush of material usage at backflush deduct points and update of the purchase order record is desired.

The actual calculated quantities of each material are held in an inventory in-process account record in step 912 if the deduct point triggers such relief in step 911. This record will continue to increment when multiple deduct point positions have been defined for a product in a production path. When the final product is completed and ready to be transferred to finished goods inventory, a final report is made. The final report may initiated multiple transactions including:

(a) A receipt transaction that increments the inventory record of each material in the finished goods inventory. The location of the material accounting can be defined when entering the completion transaction. The transaction can also update the records in a demand-based management system to identify completions in a daily rate work release record.

(b) Multiple relieving transactions can be calculated for each material. These can process to finally update the inventory record for the material as follows:
  (I) The quantity of each material can be checked against the inventory in-process account record and this record can be relieved for the calculated quantity.
  (II) If there is insufficient inventory in the in-process account record to satisfy the calculated quantity for the material then that quantity that is present will be relieved and the balance of the quantity processed to relieve the default inventory functional area and location.

The completed relief of the inventory record, both of the in-process inventory account and the actual physical inventory location, can then be achieved. The above design provides for the user to maintain integrity of the inventory records even if the completion reporting at any deduct point was not processed during the production activity.

Since it is very possible that multiple products will be in the manufacturing production path at the same time, management system 900 allows the inventory both in the normal inventory records and the inventory in-process account to be maintained.

When the backflush activity is required to relieve a quantity of material from a purchase order, then this purchase order number can be defined as the deduct point for that material. This normally requires that the purchase order be a blanket/contract order that had established the procurement relationship with a supplier. This is desirable to minimize the update of the deduct point identity as procurement orders change over time. All transaction records processed, normal inventory relief, scrap transactions, or purchase order updates can create historical records in the inventory transaction file.

In FIG. 9, step 913 then initiates procurement of material that has been backflushed by system 900. Material inventories in the material flow system, therefore, are maintained in a steady-state condition as material is pulled to the production line by the material flow system and product is pulled towards a final product by the manufacturing line. System 900 then returns to step 901 in order to begin the monitoring loop of system 900 again.

The creation of the material backflush deduct point management environment can be supported by the use of a management control of the reporting to maintain the accuracy of the inventory records in the dynamic mixed-model manufacturing flow system. In particular, the monitoring of the bill-of-material records for all products being manufactured is critical to the support of the backflush deduct point management, due to the definition of the point of use quantity provided from the bill-of-material record source. Bill-of-material structures are subject to engineering changes to ensure improvements are made to the products. Such changes often impact the materials used to build products, either by change to the actual component material designated or to the point of use quantity defined. When such changes are made the deduct point definition should be updated to reflect these changes to ensure the correct maintenance of the deduct point information that will control relief of the correct material used in the production path.

The above examples are demonstrative only and are not intended as limiting. One of ordinary skill in the art will recognize that there are many variations of the above examples which will be within the scope of this invention. As such, the invention is limited only by the following claims.

I claim:

1. A material flow design system, comprising a computer system executing a software program having software segments for:
   determining a material requirements for a manufacturing line, the material requirements including at least one material required by the manufacturing line, the determining act comprising:
      obtaining a bill-of-material for each product produced by the manufacturing line, the bill-of-material including at least one material required by the manufacturing line to produce the product;
      adding each of the at least one material from the bill-of-material for each product to the material requirements; and
      wherein the manufacturing line includes at least one process, the material requirements includes materials requirements at each of the at least one process of the manufacturing line, and the material requirements further include an overall materials requirements for the manufacturing line;
   determining whether each of the material included in the material requirements of the manufacturing line is purchased or manufactured in an independent production path;
   if the material requirements are purchased, defining at least one replenishment material pull sequence for each of the at least one material of the material requirements, the replenishment material pull sequences including at least one point-of-usage associated with a process located on the manufacturing line, the defining act comprising:
      determining at least one process that requires the material;
      determining a point-of-usage re-supply to the at least one process; and
      determining whether any other point-of-usage re-supplies should be utilized to replenish the point-of-usage re-supply between the point-of-usage and an external raw inventory storage; and
   if the material requirements are purchased, sizing replenishment containers, the replenishment containers located at each of the at least one point-of-usage of the at least one replenishment material pull sequence, the sizing act comprising:
      determining a replenishment time for each replenishment container, each point-of-usage in the replenishment material pull sequence includes a replenishment container and a replenishment signal;
      determining a signal type for the replenishment signal, where the signal type is either a single card signal or a multiple card signal;
      defining a signal card for the replenishment signal; and
      calculating the size of the container based on parameters that include the replenishment time, a demand at capacity for material at the point-of-usage, a package size for purchased material, and the signal type.

2. A material flow design system, comprising a computer system executing a software program having software segments for:
   determining a material requirements for a manufacturing line, the material requirements including at least one material required by the manufacturing line, the determining act comprising:
      obtaining a bill-of-material for each product produced by the manufacturing line, the bill-of-material including at least one material required by the manufacturing line to produce the product;
      adding each of the at least one material from the bill-of-material for each product to the material requirements; and
      wherein the manufacturing line includes at least one process, the material requirements includes materials requirements at each of the at least one process of the manufacturing line, and the material requirements further include an overall materials requirements for the manufacturing line;
   determining whether each of the material included in the material requirements of the manufacturing line is purchased or manufactured in an independent production path;
   if the material requirements are manufactured in an independent production path, defining at least one replenishment material pull sequence for each of the at least one material of the material requirements, the replenishment material pull sequences including at least one point-of-usage associated with a process located on the manufacturing line, the defining act comprising:
    determining at least one process that requires the material;
    determining a point-of-usage re-supply to the at least one process; and
    determining whether any other point-of-usage re-supplies should be utilized to replenish the point-of-usage re-supply between the point-of-usage and an external raw inventory storage; and
if the material requirements are manufactured in an independent production path, sizing replenishment containers, the replenishment containers located at each of the at least one point-of-usage of the at least one replenishment material pull sequence, the sizing act comprising:
    calculating a run to replenishment amount for the independent production path;
    calculating replenishment times;
    calculating the material needed;
    determining a signal type for the replenishment signal by calculating whether a single signal card or a multiple signal card system is used;
    defining a signal card for the replenishment signal based on the signal type; and
    calculating a quantity of material required for each container, wherein each point-of-usage in the replenishment material pull sequence includes a container and a replenishment signal.

3. A method for designing a material flow system, comprising:
    determining a material requirements for a manufacturing line, the material requirements including at least one material required by the manufacturing line, the determining act comprising:
        obtaining a bill-of-material for each product produced by the manufacturing line, the bill-of-material including at least one material required by the manufacturing line to produce the product;
        adding each of the at least one material from the bill-of-material for each product to the material requirements; and
        wherein the manufacturing line includes at least one process, the material requirements includes materials requirements at each of the at least one process of the manufacturing line, and the material requirements further include an overall materials requirements for the manufacturing line;
    determining whether each of the material included in the material requirements of the manufacturing line is purchased or manufactured in an independent production path;
    if the material requirements are purchased, defining at least one replenishment material pull sequence for each of the at least one material of the material requirements, the replenishment material pull sequences including at least one point-of-usage associated with a process located on the manufacturing line, the defining act comprising:
        determining at least one process that requires the material;
        determining a point-of-usage re-supply to the at least one process; and
        determining whether any other point-of-usage re-supplies should be utilized to replenish the point-of-usage re-supply between the point-of-usage and an external raw inventory storage; and
    if the material requirements are purchased, sizing replenishment containers, the replenishment containers located at each of the at least one point-of-usage of the at least one replenishment material pull sequence, the sizing act comprising:
        determining a replenishment time for each replenishment container, each point-of-usage in the replenishment material pull sequence includes a replenishment container and a replenishment signal;
        determining a signal type for the replenishment signal, where the signal type is either a single card signal or a multiple card signal;
        defining a signal card for the replenishment signal; and
        calculating the size of the container based on parameters that include the replenishment time, a demand at capacity for material at the point-of-usage, a package size for purchased material, and the signal type.

4. A method for designing a material flow system, comprising:
    determining a material requirements for a manufacturing line, the material requirements including at least one material required by the manufacturing line, the determining act comprising:
        obtaining a bill-of-material for each product produced by the manufacturing line, the bill-of-material including at least one material required by the manufacturing line to produce the product;
        adding each of the at least one material from the bill-of-material for each product to the material requirements; and
        wherein the manufacturing line includes at least one process, the material requirements includes materials requirements at each of the at least one process of the manufacturing line, and the material requirements further include an overall materials requirements for the manufacturing line;
    determining whether each of the material included in the material requirements of the manufacturing line is purchased or manufactured in an independent production path;
    if the material requirements are manufactured in an independent production path, defining at least one replenishment material pull sequence for each of the at least one material of the material requirements, the replenishment material pull sequences including at least one point-of-usage associated with a process located on the manufacturing line, the defining act comprising:
        determining at least one process that requires the material;
        determining a point-of-usage re-supply to the at least one process; and
        determining whether any other point-of-usage re-supplies should be utilized to replenish the point-of-usage re-supply between the point-of-usage and an external raw inventory storage; and
    if the material requirements are manufactured in an independent production path, sizing replenishment containers, the replenishment containers located at each of the at least one point-of-usage of the at least one replenishment material pull sequence, the sizing act comprising:
        calculating a run to replenishment amount for the independent production path;

calculating replenishment times;
calculating the material needed;
determining a signal type for the replenishment signal by calculating whether a single signal card or a multiple signal card system is used;
defining a signal card for the replenishment signal based on the signal type; and
calculating a quantity of material required for each container, wherein each point-of-usage in the replenishment material pull sequence includes a container and a replenishment signal.

5. A method in a material flow design system for controlling a material flow to a manufacturing line including at least one process, the method comprising:

(a) determining a material requirements for the manufacturing line, the material requirements including a material required by the manufacturing line to produce a product, the material being purchased from an external raw storage;

(b) defining a replenishment material pull sequence for the material purchased from the external raw storage, the replenishment material pull sequence including a point-of-usage associated with a process located on the manufacturing line, the defining act (b) comprising:
  (i) determining the process that requires the material;
  (ii) determining a first point-of-usage re-supply associated with the process; and
  (ii) determining whether any other point-of-usage re-supplies should be utilized to replenish the first point-of-usage re-supply between the point-of-usage and the external raw storage; and (c) sizing replenishment containers located at the point-of-usage of the replenishment material pull sequence.

6. A method as defined in claim 5 wherein the sizing act (c) comprises:
  (i) determining a replenishment time for each replenishment container;
  (ii) determining a signal type for a replenishment signal located at the point of usage, wherein the signal type is determined to be either a single signal card system or multiple signal card system;
  (iii) defining a signal card for the replenishment signal; and
  (iv) calculating the size of the container based on parameters that include the replenishment time, a demand at capacity for material at the point-of-usage, a package size for purchased material, and the signal type.

7. A method as defined in claim 5 wherein the determining act (a) comprises:
  (i) obtaining a bill-of-material for the product produced by the manufacturing line, the bill-of-material including the material required by the manufacturing line to produce the product; and
  (ii) adding the material from the bill-of-material for the product to the material requirements.

8. A method in a material flow design system for controlling a material flow to a manufacturing line including at least one process, the method comprising:

(a) determining a material requirements for the manufacturing line, the material requirements including a material required by the manufacturing line to produce a product, the material being manufactured in an independent production path;

(b) defining a replenishment material pull sequence or the material purchased from the external raw storage, the replenishment material pull sequence including a point-of-usage associated with a process located on the manufacturing line and the point-of-usage including a replenishment signal; and (c) sizing replenishment containers located at the point-of-usage of the replenishment material pull sequence, the sizing act (c) comprising:
  (i) determining a signal type for the replenishment signal wherein the signal type is determined to be either a single signal card system or multiple signal card system;
  (ii) defining a signal card system for the replenishment signal based on the signal type; and
  (iii) calculating a quantity of the material required for each container.

9. A method as defined in claim 8 wherein the determining act (a) comprises:
  (i) obtaining a bill-of-material for the product produced by the manufacturing line, the bill-of-material including the material required by the manufacturing line to produce the product; and
  (ii) adding the material from the bill-of-material for the product to the material requirements.

10. A method as defined in claim 8 wherein the defining act (b) comprises:
  (i) determining the process that requires the material;
  (ii) determining a first point-of-usage re-supply associated with the process; and
  (ii) determining whether any other point-of-usage re-supplies should be utilized to replenish the first point-of-usage re-supply between the point-of-usage and the external raw storage.

11. A method as defined in claim 10, wherein the defining act (c)(ii) defines the signal card as being either a single card system or a multiple card system.

* * * * *